(12) United States Patent
Lorensson et al.

(10) Patent No.: US 11,586,800 B2
(45) Date of Patent: *Feb. 21, 2023

(54) DOCUMENT ARCHITECTURE WITH FRAGMENT-DRIVEN ROLE BASED ACCESS CONTROLS

(71) Applicant: Open Text SA ULC, Halifax (CA)

(72) Inventors: Johan Lorensson, Gothenburg (SE); Christian Wessman, Gothenburg (SE); Sverker Wendelöv, Gothenburg (SE); Robert Smith, Gothenburg (SE)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,270

(22) Filed: Aug. 3, 2021

(65) Prior Publication Data

US 2021/0365626 A1    Nov. 25, 2021

Related U.S. Application Data

(63) Continuation of application No. 16/797,896, filed on Feb. 21, 2020, now Pat. No. 11,106,856, which is a (Continued)

(51) Int. Cl.
*G06F 40/103*    (2020.01)
*G06F 16/93*    (2019.01)
(Continued)

(52) U.S. Cl.
CPC ........ *G06F 40/103* (2020.01); *G06F 3/04847* (2013.01); *G06F 16/93* (2019.01);
(Continued)

(58) Field of Classification Search
CPC .... G06F 40/103; G06F 40/131; G06F 40/197; G06F 16/93; G06F 3/04847;
(Continued)

(56) References Cited

U.S. PATENT DOCUMENTS 5,299,304 A    3/1994  Williams
5,524,250 A    6/1996  Chesson
(Continued)

FOREIGN PATENT DOCUMENTS

WO    WO 2006041340    4/2006

OTHER PUBLICATIONS

Notice of Allowance for U.S. Appl. No. 15/607,091, dated Jun. 14, 2022, 4 pgs.
(Continued)

*Primary Examiner* — Sanchit K Sarker
(74) *Attorney, Agent, or Firm* — Sprinkle IP Law Group

(57) ABSTRACT

A document production system may construct a document from fragments based on a theme associated with the document. The theme may contain section(s), each section having an access control list (ACL) associated therewith. The ACL may specify role-based user group(s) and permission(s) for the role-based user group(s). The system may evaluable rules applicable to the document. At least one rule may pertain to the ACL(s). The evaluation may include, at least in part, utilizing user login information received over a network from a client device. In constructing the document, the system may assemble the document in accordance with the rules and utilizing the fragments and meta information that describes the document. The system may render the document thus assembled utilizing the ACL, generate a view of the document, and communicate the view of the document over the network to the client device for presentation on the client device.

17 Claims, 33 Drawing Sheets

Related U.S. Application Data continuation of application No. 15/607,111, filed on May 26, 2017, now Pat. No. 10,606,921.

(60) Provisional application No. 62/360,099, filed on Jul. 8, 2016, provisional application No. 62/342,459, filed on May 27, 2016.

(51) Int. Cl.

| | | |
|---|---|---|
| *G06F 40/131* | (2020.01) | |
| *G06F 40/197* | (2020.01) | |
| *G06F 3/04847* | (2022.01) | |
| *G06F 21/60* | (2013.01) | |
| *G06F 21/62* | (2013.01) | |
| *H04L 9/40* | (2022.01) | |
| *H04L 67/1095* | (2022.01) | |

(52) U.S. Cl.
CPC .......... *G06F 21/604* (2013.01); *G06F 21/62* (2013.01); *G06F 40/131* (2020.01); *G06F 40/197* (2020.01); *H04L 63/101* (2013.01); *H04L 63/104* (2013.01); *H04L 63/123* (2013.01); *H04L 67/1095* (2013.01)

(58) Field of Classification Search
CPC ..... G06F 21/604; G06F 21/62; H04L 63/101; H04L 63/104; H04L 63/123
See application file for complete search history.

(56) References Cited

U.S. PATENT DOCUMENTS

| | | | |
|---|---|---|---|
| 5,713,014 A | 1/1998 | Durflinger | |
| 5,911,776 A | 6/1999 | Guck | |
| 5,970,490 A | 10/1999 | Morgenstern | |
| 5,995,996 A | 11/1999 | Venable | |
| 6,012,098 A | 1/2000 | Bayeh | |
| 6,151,608 A | 11/2000 | Abrams | |
| 6,172,988 B1 | 1/2001 | Tiernan | |
| 6,236,997 B1 | 5/2001 | Bodamer | |
| 6,243,107 B1 | 6/2001 | Valtin | |
| 6,263,332 B1 | 7/2001 | Nasr | |
| 6,275,536 B1 | 8/2001 | Chen | |
| 6,324,568 B1 | 11/2001 | Diec | |
| 6,336,124 B1 | 1/2002 | Alam | |
| 6,336,139 B1 | 1/2002 | Feridun | |
| 6,397,232 B1 | 5/2002 | Cheng-Hung | |
| 6,484,178 B1 | 11/2002 | Bence, Jr. | |
| 6,587,972 B1 | 7/2003 | Baird | |
| 6,623,529 B1 | 9/2003 | Lakritz | |
| 6,643,701 B1 | 11/2003 | Aziz | |
| 6,668,254 B2 | 12/2003 | Matson | |
| 6,748,020 B1 | 6/2004 | Eifrig | |
| 6,782,379 B2 | 8/2004 | Lee | |
| 6,810,429 B1 | 10/2004 | Walsh | |
| 6,816,871 B2 | 11/2004 | Lee | |
| 6,877,156 B2 | 4/2005 | Osborne | |
| 7,043,687 B2 | 5/2006 | Knauss | |
| 7,054,952 B1 | 5/2006 | Schwerdtfeger | |
| 7,055,096 B2 | 5/2006 | Namioka | |
| 7,127,520 B2 * | 10/2006 | Ladd | G06F 9/546 375/240.26 |
| 7,143,087 B2 | 11/2006 | Fairweather | |
| 7,213,249 B2 | 5/2007 | Tung Loo | |
| 7,216,163 B2 | 5/2007 | Sinn | |
| 7,225,256 B2 | 5/2007 | Villavicencio | |
| 7,257,600 B2 | 8/2007 | Matson | |
| 7,284,235 B2 | 10/2007 | Nachmanson | |
| 7,302,678 B2 | 11/2007 | Bohlmann | |
| 7,308,399 B2 | 12/2007 | Fallen-Bailey | |
| 7,461,403 B1 | 12/2008 | Libenzi | |
| 7,478,402 B2 | 1/2009 | Christensen | |
| 8,380,830 B2 | 2/2013 | Ladd | |
| 8,788,699 B2 | 7/2014 | Kitagata | |
| 8,825,627 B1 * | 9/2014 | Indukuri | G06F 16/904 707/738 |
| 8,914,809 B1 | 12/2014 | Cohen | |
| 9,047,146 B2 | 6/2015 | Ladd | |
| 9,237,120 B2 | 1/2016 | Cohen | |
| 9,400,703 B2 | 7/2016 | Ladd | |
| 10,210,028 B2 | 2/2019 | Ladd | |
| 10,496,458 B2 | 12/2019 | Ladd | |
| 10,534,843 B2 | 1/2020 | Smith | |
| 10,606,921 B2 | 3/2020 | Lorensson | |
| 10,922,158 B2 | 2/2021 | Ladd | |
| 11,106,856 B2 | 8/2021 | Lorensson | |
| 11,263,383 B2 | 3/2022 | Smith | |
| 11,360,833 B2 | 6/2022 | Ladd | |
| 11,481,537 B2 | 10/2022 | Smith | |
| 2001/0047369 A1 | 11/2001 | Aizikowitz | |
| 2001/0056362 A1 | 12/2001 | Hanagan | |
| 2002/0059076 A1 | 5/2002 | Grainger | |
| 2002/0065848 A1 | 5/2002 | Walker | |
| 2002/0083124 A1 * | 6/2002 | Knox | G06F 16/10 707/E17.01 |
| 2002/0083205 A1 | 6/2002 | Leon | |
| 2002/0165975 A1 | 11/2002 | Abbott | |
| 2003/0023336 A1 | 1/2003 | Kreidler | |
| 2003/0065623 A1 | 4/2003 | Corneil | |
| 2003/0085902 A1 | 5/2003 | Vogelaar | |
| 2004/0133635 A1 * | 7/2004 | Spriestersbach | G06F 16/9577 709/217 |
| 2004/0143738 A1 | 7/2004 | Savage | |
| 2005/0071150 A1 * | 3/2005 | Nasypny | G06F 16/3344 707/E17.084 |
| 2005/0160086 A1 | 7/2005 | Haraguchi | |
| 2005/0240876 A1 * | 10/2005 | Myers | G06F 40/143 715/236 |
| 2006/0064467 A1 | 3/2006 | Libby | |
| 2006/0095511 A1 | 5/2006 | Munarriz | |
| 2006/0233108 A1 | 10/2006 | Krishnan | |
| 2009/0064175 A1 | 3/2009 | Taylor | |
| 2009/0254572 A1 * | 10/2009 | Redlich | G06Q 10/06 |
| 2010/0325102 A1 * | 12/2010 | Maze | G06F 16/93 707/738 |
| 2010/0332973 A1 * | 12/2010 | Kloiber | G06F 16/958 715/255 |
| 2011/0296048 A1 | 12/2011 | Knox | |
| 2013/0081132 A1 | 3/2013 | Lee | |
| 2016/0012465 A1 * | 1/2016 | Sharp | G06Q 20/321 705/14.17 |
| 2016/0162478 A1 * | 6/2016 | Blassin | G06Q 10/063112 706/12 |
| 2016/0232143 A1 * | 8/2016 | Fickenscher | G06F 16/248 |
| 2016/0253841 A1 | 9/2016 | Ur | |
| 2016/0255076 A1 | 9/2016 | Lee | |
| 2017/0344526 A1 | 11/2017 | Smith | |
| 2017/0346828 A1 * | 11/2017 | Lorensson | G06F 40/197 |
| 2019/0121684 A1 | 4/2019 | Ladd | |
| 2020/0117849 A1 | 4/2020 | Smith | |
| 2020/0193082 A1 * | 6/2020 | Lorensson | G06F 21/62 |
| 2021/0124631 A1 | 4/2021 | Ladd | |
| 2022/0164519 A1 | 5/2022 | Smith | |

OTHER PUBLICATIONS

Office Action for U.S. Appl. No. 15/607,091, dated Mar. 2, 2022, 9 pgs.

Office Action for U.S. Appl. No. 15/607,091, dated Sep. 24, 2021, 9 pgs.

Thomas-Kerr, J., Burnett, I., and Ritz, C., "Format-Independent Rich Media Delivery Using the Bitstream Binding Language," IEEE Transactions on Multimedia, vol. 10, No. 3, Apr. 2008, pp. 514-522.

Office Action for U.S. Appl. No. 17/139,759, dated Oct. 15, 2021, 22 pgs.

Notice of Allowance for U.S. Appl. No. 16/708,069, dated Oct. 21, 2021, 2 pgs.

Office Action for U.S. Appl. No. 10/184,430, dated Sep. 21, 2005, 12 pgs.

(56) References Cited

OTHER PUBLICATIONS

Office Action for U.S. Appl. No. 11/583,369, dated Apr. 3, 2009, 8 pgs.
Office Action for U.S. Appl. No. 12/573,352, dated Sep. 13, 2010, 9 pgs.
Office Action for U.S. Appl. No. 13/092,771, dated Jul. 20, 2011, 12 pgs.
Office Action for U.S. Appl. No. 13/092,771, dated Jan. 4, 2012, 13 pgs.
Office Action for U.S. Appl. No. 13/745,096, dated Sep. 30, 2013, 10 pgs.
Office Action for U.S. Appl. No. 13/454,492, dated Nov. 26, 2013, 18 pgs.
Office Action for U.S. Appl. No. 13/745,096, dated Jan. 15, 2014, 15 pgs.
Office Action for U.S. Appl. No. 13/745,096, dated Jul. 25, 2014, 16 pgs.
Office Action for U.S. Appl. No. 14/638,700, dated Mar. 26, 2015, 14 pgs.
Office Action for U.S. Appl. No. 14/638,700, dated Oct. 6, 2015, 13 pgs.
Office Action for U.S. Appl. No. 15/174,591, dated Feb. 3, 2017, 22 pgs.
Office Action for U.S. Appl. No. 15/174,591, dated Jul. 21, 2017, 19 pgs.
Müldner, Tomasz, Robin McNeill and Jan Krzysztof Miziolek in "Secure Publishing using Schema-level Role-based Access Control Policies for Fragments of XML Documents." Presented at Balisage: The Markup Conference 2008, Montreal, Canada, Aug. 12- 15, 2008. In Proceedings of Balisage: The Markup Conference 2008. Balisage Series on Markup Technologies, vol. 1 (2008), doi:10.4242/BalisageVol1.Muldner01.
Office Action for U.S. Appl. No. 15/607,091, dated Mar. 19, 2018, 8 pgs.
Office Action for U.S. Appl. No. 15/607,091, dated Nov. 28, 2018, 8 pgs.
Office Action for U.S. Appl. No. 15/607,111, dated Jan. 30, 2019, 55 pgs.
Office Action for U.S. Appl. No. 15/607,036, dated Apr. 17, 2019, 7 pgs.
Office Action for U.S. Appl. No. 15/607,111, dated Jul. 12, 2019, 62 pgs.
Sihem Amer-Yahia et al., A Web-Services Architecture for Efficient XML Data Exchange, 2004, Proceedings of the 20th Int'l Conf. on Data Engineering (ICDE'04), pp. 1-12.
Office Action for U.S. Appl. No. 15/607,091, dated Sep. 17, 2019, 8 pgs.
Nord, et al., "Reviewing Architecture Documents Using Question Sets," 2009 Joint Working IEEE/IFIP Conference on Software Architecture & European Conference on Software Architecture, Sep. 2009, pp. 1-4.
Office Action for U.S. Appl. No. 15/607,091, dated Feb. 19, 2020, 9 pgs.
Office Action for U.S. Appl. No. 15/607,091, dated Mar. 15, 2021, 9 pgs.
Notice of Allowance for U.S. Appl. No. 16/797,896, dated May 26, 2021, 19 pgs.
Office Action for U.S. Appl. No. 16/708,069, dated Jun. 14, 2021, 7 pgs.
Notice of Allowance for U.S. Appl. No. 17/139,759, dated Feb. 16, 2022, 6 pgs.
Office Action for U.S. Appl. No. 17/666,876, dated Oct. 31, 2022, 6 pgs.

\* cited by examiner

| Utility Co. | Pay Now ▶ | Total Balance Due $511.33 | Due Date 1/4/2016 | Account Number XXXX36400034 |

Jane Doe
123 Main Street
Great City, MI 48888

Make a Triple Play. Enroll in Utility Co's Automatic Payment, eBill Paperless Billing or BudgetWise Billing by June 15 and be automatically entered for a chance to win a tablet, eReader or laptop computer! Go to Utilityco.com/tripleplay

A DEDICATED BUSINESS CENTER JUST FOR YOU.

[Learn more]

Bill Summary

| | |
|---|---|
| Account Balance as of 11/30/2015 | 822.47 |
| Payment Received 11/27/2015 | -822.47 |
| Balance Prior to Current Charges | 0.00 |
| Current Charges | |
| Utility Co. Electric Company Business Electric Service | 94.48 |
| Utility Co. Gas Company Gas Commercial Heating | 416.85 |
| Total Current Charges | 511.33 |
| Account Balance as of 12/31/2015 | 511.33 |

Pay Now ▶
Current Bill ▶
View This Month's Bill Inserts ▶
Previous Bills ▶

Usage Summary

Utility Co. Electric Company Business Electric Service Current Billing Information Service Period Dec 1. 1, 2015 - Dec. 31, 2015
Days Billed: 31

Usage History - Average per day

| | Current Month | Last Month | Year Ago |
|---|---|---|---|
| KWH Usage | 27.7 | 33.1 | 29.3 |
| Change | | -16% | -5% |

Utility Co. Gas Company Gas Commercial heating Current Billing Information

Service Period Dec 1. 1, 2015 - Dec. 31, 2015
Days Billed: 31

Usage History - Average per day

| | Current Month | Last Month | Year Ago |
|---|---|---|---|
| CCF Usage | 19.0 | 31.0 | 19.6 |
| Change | | -38% | -3% |

Be More Energy Efficient

Let our interactive business show you how to take control of your energy use.

Visit our Interactive Business

Efficiency Tools Video

Online tools designed to help Businesses save energy.

View the Video

Landlord Program

If you own rental properties, our Automatic Transfer of Service program effectively transfer's service responsibility between tenant and landlord.

Learn More

| Utility Co. | Pay Now ▶ | Total Balance Due $511.33 | Due Date 1/4/2016 | Account Number XXXX36400034 |

Jane Doe
123 Main Street
Great City, MI 48888

Make a Triple Play. Enroll in Utility Co's Automatic Payment, eBill Paperless Billing or BudgetWise Billing by June 15 and be automatically entered for a chance to win a tablet, eReader or laptop computer! Go to Utilityco.com/tripleplay A DEDICATED BUSINESS CENTER JUST FOR YOU.    Learn more

Bill Summary

| | |
|---|---|
| Account Balance as of 11/30/2015 | 822.47 |
| Payment Received 11/27/2015 | -822.47 |
| Balance Prior to Current Charges | 0.00 |
| Current Charges | |
| Utility Co. Electric Company Business Electric Service | 94.48 |
| Utility Co. Gas Company Gas Commercial Heating | 416.85 |
| Total Current Charges | 511.33 |
| Account Balance as of 12/31/2015 | 511.33 |

Pay Now ▶
Current Bill ▶
View This Month's Bill Inserts ▶
Previous Bills ▶

Usage Summary

Utility Co. Electric Company Business Electric Service Current Billing Information Service Period Dec 1. 1, 2015 - Dec. 31, 2015
Days Billed: 31

Usage History - Average per day

| | Current Month | Last Month | Year Ago |
|---|---|---|---|
| KWH Usage | 27.7 | 33.1 | 29.3 |
| Change | | -16% | -5% |

Utility Co. Gas Company Gas Commercial heating Current Billing Information

Service Period Dec 1. 1, 2015 - Dec. 31, 2015
Days Billed: 31

610

Be More Energy Efficient

Let our interactive business show you how to take control of your energy use.

Visit our Interactive Business

Efficiency Tools Video

Online tools designed to help Businesses save energy.

View the Video

Landlord Program

If you own rental properties, our Automatic Transfer of Service program effectively transfer's service responsibility between tenant and landlord.

Learn More

MRS. AA FEMALE SAP AAA
ALTERNATE ADDRESS STREET

Below are the details of your billing as of 15/06/2014

| Regular Premium Due 15/06/2014 | : | PHP 31,250.00 |
| Regular Top Up | : | PHP 55,000.00 |
| Less: Excess Deposit | : | 8,750.00 |

TOTAL DUE as of 15/06/2014 : PHP 31,250.00

Please pay on or before 15/06/2014 to avoid any inconvenience.

XYZ

| BILLING SUMMARY for Policy No. 00000340 ||
|---|---|
| Premium Due PHP 31,250.00 | Due Date 15/06/2014 |

Please pay on or before the due date to keep your policy in force

| Policy Number | : | 00000340 |
| Base Plan Name | : | DEMO |
| Name of Assured | : | MRS. AA FEMALE SAP AAA |
| Sum Assured | : | 500,000.00 |
| Currency | : | Peso |
| Mode of Payment | : | DEMO |

For more information on your policy/ies and other service requests, you may access your amount through XYZ Customer Connect Portal through www.xyz.com.ph. You may also contact your agent, or email us at CustomerConnect.ph@xyz.com or call our Customer Connect Hotline at (632) 555-8355.

Pay through Auto Debit by accomplishing an Authorization to Debit Form.

Pay through Auto Charge by accomplishing a Credit Card enrolment Form.

When making a payment, please indicate the 2-digit transaction code + 8-digit policy number in the Account Number (BDO/Metrobank) or Policy Reference Number (BPI) fields of the Bills Payment Slip.

Please refer to the list of transaction codes below:

- 03 + Subsequent Payment
- 04 + Balance to Annual Payment
- 05 + Lump Sum Top
- 06 + Reinstatement Payment
- 09 + Balance for Policy Change

LIFE INSURANCE — 710

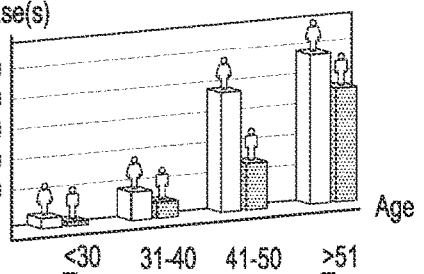
Claim Case(s) — 715

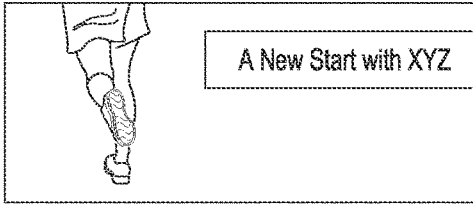
A New Start with XYZ — 720

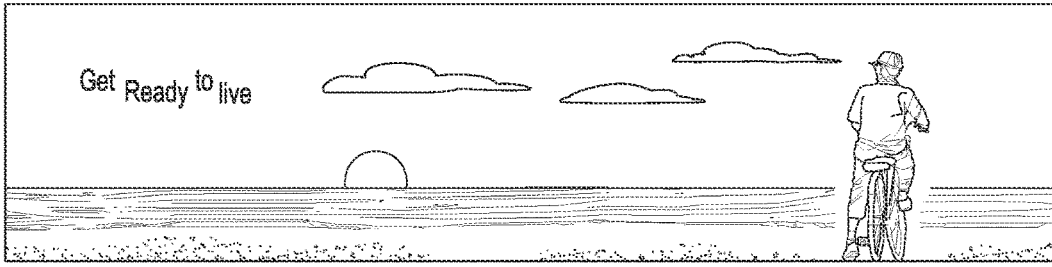
Get Ready to live — 725

MRS. AA FEMALE SAP AAA
ALTERNATE ADDRESS STREET

Below are the details of your billing as of 15/06/2014

| | |
|---|---|
| Regular Premium Due 15/06/2014 : | PHP 31,250.00 |
| Regular Top Up : | PHP 55,000.00 |
| Less: Excess Deposit : | 8,750.00 |
| TOTAL DUE as of 15/06/2014 : | PHP 31,250.00 |

XYZ

| BILLING SUMMARY for Policy No. 00000340 ||
|---|---|
| Premium Due | Due Date |
| PHP 31,250.00 | 15/06/2014 |

Please pay on or before the due date to keep your policy in force

| | | |
|---|---|---|
| Policy Number | : | 00000340 |
| Base Plan Name | : | DEMO |
| Name of Assured | : | MRS. AA FEMALE SAP AAA |
| Sum Assured | : | 500,000.00 |
| Currency | : | Peso |
| Mode of Payment | : | DEMO |

Please pay on or before 15/06/2014 to avoid any inconvenience.

For more information on your policy/ies and other service requests, you may access your amount through XYZ Customer Connect Portal through www.xyz.com.ph. You may also contact your agent, or email us at CustomerConnect.ph@xyz.com or call our Customer Connect Hotline at (632) 555-8355.

Pay through Auto Debit by accomplishing an Authorization to Debit Form.

Pay through Auto Charge by accomplishing a Credit Card enrolment Form.

When making a payment, please indicate the 2-digit transaction code + 8-digit policy number in the Account Number (BDO/Metrobank) or Policy Reference Number (BPI) fields of the Bills Payment Slip.

Please refer to the list of transaction codes below:

03 +   Subsequent Payment
04 +   Balance to Annual Payment
05 +   Lump Sum Top
06 +   Reinstatement Payment
09 +   Balance for Policy Change

*This is a system-generated correspondence. If issued without alteration, this does not require a signature.*
cc: SWAPNIL TEST AGENT/60000003/Agent sales unit 00003

XYZ Customer Confidential

XYZ Life Insurance Corporation
120 Fifth Street., 5th Avenue, Alpha City, Pasig City 1634 Philippines
T: (555) 888 8393 | F: (555)558 7393

XYZ.COM.PH

<invoice nr="123">
....
</invoice>

730

18/05/2014

MRS. AA FEMALE SAP AAA
ALTERNATE ADDRESS STREET

Below are the details of your billing as of 15/06/2014

| | | |
|---|---|---|
| Regular Premium Due 15/06/2014 | : | PHP 31,250.00 |
| Regular Top Up | : | PHP 55,000.00 |
| Less: Excess Deposit | : | 8,750.00 |

TOTAL DUE as of 15/06/2014 : PHP 31,250.00

Please pay on or before 15/06/2014 to avoid any inconvenience.

XYZ 

| BILLING SUMMARY for Policy No. 00000340 ||
|---|---|
| Premium Due PHP 31,250.00 | Due Date 15/06/2014 |

Please pay on or before the due date to keep your policy in force

| | | |
|---|---|---|
| Policy Number | : | 00000340 |
| Base Plan Name | : | DEMO |
| Name of Assured | : | MRS. AA FEMALE SAP AAA |
| Sum Assured | : | 500,000.00 |
| Currency | : | Peso |
| Mode of Payment | : | DEMO |

For more information on your policy/ies and other service requests, you may access your amount through XYZ Customer Connect Portal through www.xyz.com.ph. You may also contact your agent, or email us at CustomerConnect.ph@xyz.com or call our Customer Connect Hotline at (632) 555-8355.

Pay through Auto Debit by accomplishing an Authorization to Debit Form.

Pay through Auto Charge by accomplishing a Credit Card enrolment Form.

When making a payment, please indicate the 2-digit transaction code + 8-digit policy number in the Account Number (BDO/Metrobank) or Policy Reference Number (BPI) fields of the Bills Payment Slip.

Please refer to the list of transaction codes below:

- 03 + Subsequent Payment
- 04 + Balance to Annual Payment
- 05 + Lump Sum Top
- 06 + Reinstatement Payment
- 09 + Balance for Policy Change

PRODUCT ADVERTISEMENT

*This is a system-generated correspondence. If issued without alteration, this does not require a signature.*
cc: SWAPNIL TEST AGENT/60000003/Agent sales unit 00003

XYZ Customer Confidential

XYZ Life Insurance Corporation
120 Fifth Street., 5th Avenue, Alpha City, Pasig City 1634 Philippines
T: (555) 888 8393 | F: (555)558 7393

XYZ.COM.PH

*Engineering update demo* — 1190

OPENTEXT™ Communications Center StoryBoard — 1100

Tools — 1130    Order from GB ∨  Undo  Redo

□ Layout  ⋮≡ Object Tree

Resources View for
TenantUser -
System Default
3 resources

Demotext — 1105
It has been created through Demo

RTF sample.rtf — 1101

Created text — 1103
This is a text created within a theme.
— 1155

— 1150

Toothpick Inc.

MrBlonde Corporation
Mr. Shaun Smith
6392 Victoria Road — 1120

Dear Mr Smith — 1151

Introduction
∨ | Demotext
Select Rule
Edit Text
Remove Resource

Toothpick Inc.
Russell Johnson
Sales Representative
1234 Main St
98765 Any City
Tel:   (555)-398-1254
Cell:  (555)-983-8309
Email:  Russell.johnson@example.com
*MrBlonde Corporation is now part of Toothpick Inc.*
⊕ — 1122
⊖ — 1105

— 1153

| | Quantity | Unit price | Total |
|---|---|---|---|
| erver Component) (Developer License) | 1.0 | 81280.0 $ | $ |
| 2. SKU-VIC-RPAS<br>Delivery Server basislicense (ApplicationserverComponent) (Developer License) | 1.0 | 24696.0 $ | $ |
| 3. SKU-VIC-RTRB<br>Tracking and Reporting Connector - Standard (Developer License) | 1.0 | 17650.0 $ | $ |
| 4. SKU-VIC-VSEK<br>Verify Search Engine Connector and Query DynaMent (Developer License) | 1.0 | 82447.0 $ | $ |

DOCUMENT ARCHITECTURE WITH FRAGMENT-DRIVEN ROLE BASED ACCESS CONTROLS

CROSS-REFERENCE TO RELATED APPLICATIONS

This is a continuation of, and claims a benefit of priority under 35 U.S.C. § 120 from, U.S. patent application Ser. No. 16/797,896, filed Feb. 21, 2020, issued as U.S. Patent No. 11,106,856, entitled "DOCUMENT ARCHITECTURE WITH FRAGMENT-DRIVEN ROLE-BASED ACCESS CONTROLS," which is a continuation of, and claims a benefit of priority under 35 U.S.C. § 120 from, U.S. patent application Ser. No. 15/607,111, filed May 26, 2017, issued as U.S. Pat. No. 10,606,921, entitled "DOCUMENT ARCHITECTURE WITH FRAGMENT-DRIVEN ROLE-BASED ACCESS CONTROLS," which claims a benefit of priority from U.S. Provisional Application No. 62/360,099, filed Jul. 8, 2016, entitled "DOCUMENT ARCHITECTURE WITH FRAGMENT-DRIVEN ROLE-BASED ACCESS CONTROLS," and U.S. Provisional Application No. 62/342,459, filed May 27, 2016, entitled "DOCUMENT ARCHITECTURE WITH EFFICIENT STORAGE AND SMART RENDERING," all of which are hereby fully incorporated herein by reference for all purposes.

TECHNICAL FIELD

This disclosure relates generally to document management systems and methods. More particularly, this disclosure relates to document management systems, methods, and architecture with fragment-driven, role-based access controls.

BACKGROUND OF THE RELATED ART

Access control lists (ACLs) are used in many types of computer systems. For example, a computer file system may use an ACL to determine which users or system processes can access objects stored therein and what operations can be performed on the given objects. ACLs used by file systems, which may run on various operating systems, are referred to as file system ACLs. A file system ACL typically has a data structure (e.g., a table) that contains entries (which are referred to herein as "access controls"), each of which specifies an individual user or group their rights to specific system objects such as programs, processes, or files. In this disclosure, access controls implemented using such a file system ACL are referred to as file system-driven, user-based access controls.

Another type of ACLs may be found in networked devices such as server computers, routers, and switches. Referred to as networking ACLs, they generally contain rules for controlling network traffic based on, for instance, port numbers or Internet Protocol (IP) addresses of a host. In this disclosure, access controls implemented using such a networking ACL are referred to as network-driven, device-based access controls.

Existing access controls such as those described above have their drawbacks. For example, using existing file system-driven, user-based access controls, the ability to control access to documents or files stored in a file system ends at the document level. Any user who has the read and write permissions to a document can view and edit the entire document, regardless of what their role might be relative to the document.

For example, a corporate attorney and a human resource manager may work together to draft an employment agreement for a new employee. They both may have the read and write permissions to view and edit the entire employment agreement, even though in their roles (e.g., titles and/or job functions) as a corporate attorney and a human resource manager, they really should have access to only the portions of the employment agreement of which they are responsible for editing. However, since they both have the read and write permissions to view and edit the entire employment agreement, there is no way to prevent either from altering the portions of the document that are not relevant to them doing their jobs. This can be a significant security issue for documents produced in a collaborative environment.

One way to address this security issue is to define an access control policy (ACP) over an entire class of eXtensible Markup Language (XML) documents specified by an XML schema definition and enforce the ACP by encrypting regions of the document using cryptographic keys, as discussed by Müldner, Tomasz, Robin McNeill and Jan Krzysztof Miziolek in "Secure Publishing using Schema-level Role-based Access Control Policies for Fragments of XML Documents." Presented at Balisage: The Markup Conference 2008, Montreal, Canada, Aug. 12-15, 2008. In *Proceedings of Balisage: The Markup Conference* 2008. Balisage Series on Markup Technologies, vol. 1 (2008), doi:10.4242/BalisageVol1.Muldner01. With this approach, a user in a particular role specified in the ACP is given a key so that the user can access the fragment of any XML document specified by the XML schema definition.

Such schema-level role-based ACPs require expensive operations such as key generation, encryption, decryption, etc. and involve complicated key management. Accordingly, there is a continuing need for innovations and improvements.

SUMMARY OF THE DISCLOSURE

Embodiments disclosed herein provide a new content management solution with fragment-driven, role-based access controls that can address the aforementioned issues, complement if not replace existing access controls, and improve the field of document management with significantly increased granularity and flexibility in access controls and substantially reduced storage requirement.

The new content management solution is realized in a document architecture (DA) that utilizes document fragments to construct documents of different versions, the versions including different software (e.g., content server) platform-specific versions, user-based role versions, different contextual versions, etc. In one aspect, the entire set of document versions may represent a genus of the document and each version a species of the genus. The DA uses document fragments to construct the different portions of the documents. The DA need not save each document, as a whole (e.g., a Word document, a Portable Document Format (PDF) file, a spreadsheet file, a presentation file, etc.), in storage; instead, the DA can save a single instance of the document fragments (that make up a document) in storage. This has a technical effect of storing "documents" in a much more efficient manner than conventional document storage solutions. The DA can use a single instance of such a "document" to render versions of the document for output. The DA provides many advantages by representing a genus of documents using document fragments instead of the multitude of fully "assembled" document versions.

In some embodiments, a method implementing the DA disclosed herein may include importing a document, for instance, via an input connector, analyzing the document to break it apart into pieces of data, applying rules to the pieces of data (e.g., metadata, headers, any designated parts, etc.) and persisting them in an internal system format (referred to herein as "messages" or "normalized fragments") in a data storage device referred to herein as a message store. A system implementing the DA disclosed herein has full control of messages stored in the message store.

The system may further process the system-formatted messages to augment, extend, or otherwise refine them with additional information/instructions. The refined results (referred to herein as "formatted data" or "formatted fragments") are checked for uniqueness and stored in another data storage device referred to herein as a document broker plus storage. As a result, only unique formatted fragments, and no duplicates, are stored in the document broker plus storage ready for use and reuse by downstream processes in the DA.

Subsequently, fragments may be retrieved from the document broker plus storage for post processing/formatting. This may involve assembling a document using the stored fragments based on instructions from a document definition associated with the document. After the document is assembled, the system invokes a driver/renderer to produce an output (e.g., a version of the document). A document may be rendered this way in different versions and in any desired format using the stored fragments. The inventive techniques include ways to include and exclude the fragments for the genus of documents and to render a species of the genus that includes a specific formatted version of the document. Furthermore, new documents may be generated from various combinations of fragments. A new document may be generated in a new or different format than the original format of a document or documents from which fragments are used to generate the new document. In some embodiments, a system implementing the DA disclosed herein may not store rendered documents—only fragments are kept in storage in the DA. Furthermore, in some embodiments, only unique fragments are stored. Since fragments can be used and reused, potentially infinitely, the system can prove to be highly efficient in data storage, particularly when the amount of data being processed is huge (e.g., hundreds of thousands, millions, or billions of documents), and can provide for intelligent and efficient document production, management, storage, and rendering.

The DA enables various inventive techniques for intelligent and efficient document production, management, storage, and rendering. The new content management solution with fragment-driven, role-based access controls, described in detail below, is one of many DA-enabled technical solutions.

In embodiments disclosed herein, a document can be constructed from fragments with ACLs specifying who can do what with them. From a user perspective, a section (e.g., "Introduction") in the layout of a document (e.g., a letter) may have one or more fragments (e.g., intro.txt, icon.jpg, etc.) and there can be multiple sections depending upon a theme of the layout. In this disclosure, a "theme" refers to a collection of HyperText Markup Language (HTML) templates, stylesheet(s), and static files. Themes can vary from document type to document type. From a system perspective, these layout "sections" (hereinafter referred to as "sections") of a theme refer to fragments disclosed herein.

According to embodiments, the system may assemble fragments of a document utilizing a theme with defined sections. However, fragments are stored separately and are version controlled by the system. They are not stored per individual sections. Indeed, the system processes document information, layout, and format separately. Yet, fragments are rendered and displayed according to the layout. Thus, the term "section" may be used in this disclosure to describe what a user may see in a document view and also to refer to the fragment or fragments against which the system may take action. A fragment-driven, role-based ACL may be associated with each "section" of a document such that fragment-driven, role-based access controls may be applied to a single fragment or multiple fragments from which the document is constructed.

In embodiments disclosed herein, an ACL for a fragment applies not only to that fragment in a particular document, but applies also to every use case (e.g., by any other document) of that fragment. In this way, if the fragment is changed, the change(s) can be populated across multiple documents constructed with that fragment. Similarly, if an ACL for a fragment is changed, the ACL change(s) can be populated across multiple documents constructed with that fragment. The fragment-driven, role-based access controls disclosed herein may be implemented in addition to or in lieu of conventional access controls such as those described above.

The various levels of access controls can have many technical effects in the real world over the lifespan of a document. For example, when a document (e.g., a contract) is being created/drafted, different users that are part of the document drafting process can view and change only the section(s) of the document that they are permitted to access and modify. Likewise, users who are tasked to review and/or approve the document may only view the section(s) of the document that they have at least the read privilege as specified by the ACLs associated with the section(s) and/or may only edit the section(s) of the document that they have the write privilege as specified by the ACLs associated with the section(s).

Multiple versions of fragments and documents can exist at any given time. The various levels/types of access controls disclosed herein can be applied to different versions of the same document, depending upon the ACLs associated with the intended recipients of the document. For example, calculations and other information that is based on the rendered content can be changed based on the specific rules that apply for that user (e.g., "Include a summary for User who is a manager"; "Include an interactive graph for User who is in marketing"; "Include a video for User who is in advertising"; etc.). Such objects (e.g., text, graph, video, etc.) can be based on the fragment data used for that specific rendition for that person at that time. As a document is rendered in a specified format, rules implementing the ACLs applicable to the document can be re-evaluated and, based on the recipient the document, fragment(s) may be included, excluded, replaced, and/or rearranged at rendering time.

In some embodiments, a method for document production may be implemented at a server computer communicatively connected to a resource repository, a client device, and a network. The method may comprise receiving user login information from the client device over the network; receiving a request for a document from the client device; and constructing the document from fragments based on a theme associated with the document. In some embodiments, the constructing may comprise retrieving, from the resource repository, the theme, the fragments associated with the theme, and meta information that describes the document. The theme may contain one or more sections, each of which may have an access control list associated therewith. The access control list may specify at least one role-based user group and at least one permission for the at least one role-based user group.

The constructing may further comprise evaluating rules applicable to the document, which may include application of access control list(s) to the one or more sections of the theme. The evaluation may include determining whether a user identified by the user login information received from the client device has permission to view or edit a section of the theme. The document is then assembled using the fragments and the meta information in accordance with the rules. At rendering time, a section, and thus any fragment contained therein, may not be included in the document if the user does not have at least a read permission to view the particular section. If the user is permitted to view, but not edit, a section, that section is rendered as a view only section. If the user is permitted to view and edit a section, that section is rendered as a user-editable section.

A view containing the rendered document can then be generated and communicated to the client device over the network for presentation on the client device. When an editable section is modified (e.g., a new fragment is inserted, an existing fragment is deleted, etc.), the section can be dynamically updated to reflect the edit and the document can be re-rendered in real time. In some cases, this may entail dynamically rearranging fragments in the section being edited.

In one embodiment, a system implementing the DA disclosed herein may comprise at least one processor, at least one non-transitory computer-readable storage medium, and stored instructions translatable by the at least one processor to perform a method substantially as described herein. Another embodiment comprises a computer program product having at least one non-transitory computer-readable storage medium storing instructions translatable by at least one processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 6A-6D depict diagrammatic representations of example versions of a document rendered from fragments augmented with rich information.

FIG. 7A depicts a diagrammatic representation of an example document in a conventional archive format.

FIGS. 7B-7C depict diagrammatic representations of example renditions of the document shown in FIG. 7A according to some embodiments.

FIGS. 11A-11E depict diagrammatic representations of an example user interface of an example application with which a fragment can be created and edited within a section of a theme according to some embodiments.

FIGS. 14A-14C depict diagrammatic representations of an example user interface of yet another example application through which users of different roles may be presented with different versions and different editable sections of the same document according to some embodiments.

DETAILED DESCRIPTION

The invention and the various features and advantageous details thereof are explained more fully with reference to the non-limiting embodiments that are illustrated in the accompanying drawings and detailed in the following description.

Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
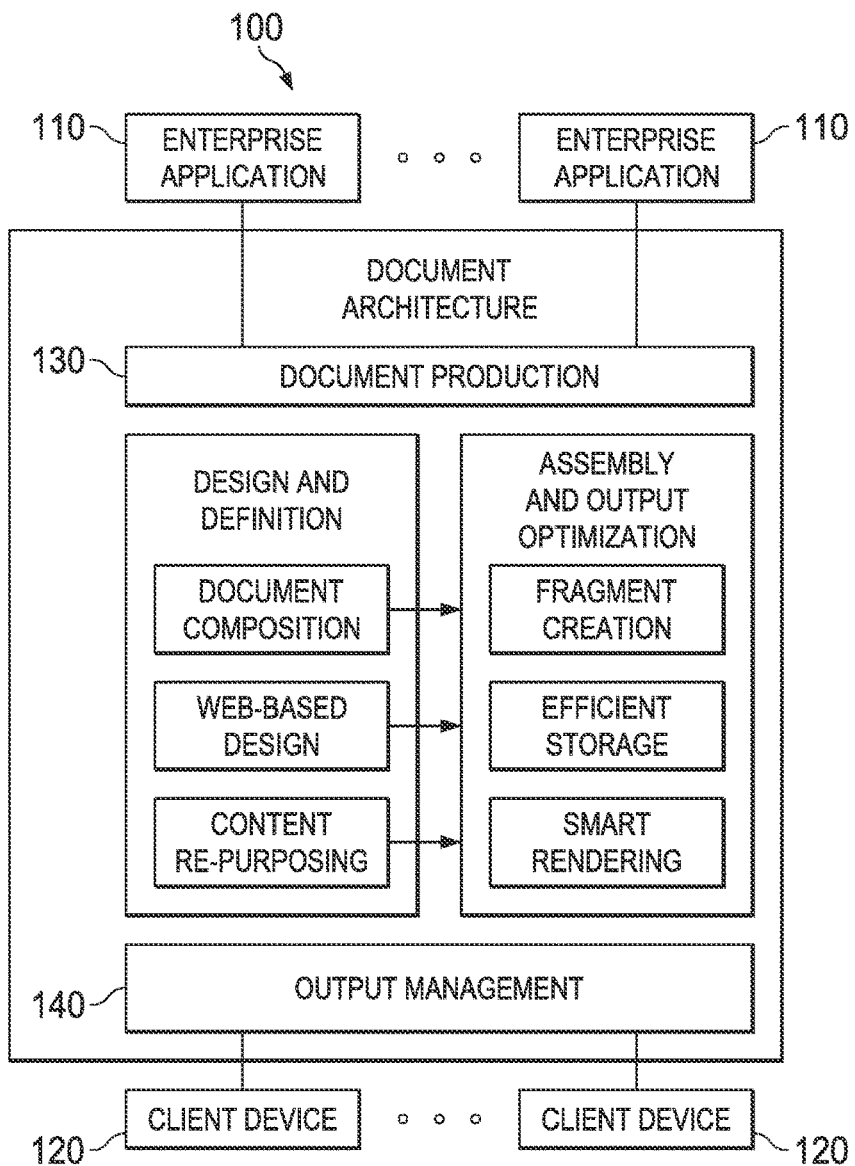
FIG. 1 depicts a diagrammatic representation of an example document architecture according to some embodiments.

FIG. 1 depicts a diagrammatic representation of an example of new and improved document architecture (DA) 100 according to some embodiments. DA 100 includes special functions that can facilitate an enterprise to communicate, for instance, with their customers and suppliers, trigger internal processes by enterprise systems (which are large-scale application software packages that support business processes information flows, reporting, and data analytics in complex organizations), and/or facilitate commercial transactions. To this end, DA 100 may include document production layer 130 that interfaces with enterprise applications 110 and output management layer 140 that interfaces with client devices 120 that utilize outputs from enterprise applications 110.

The special functions of DA 100 may be explained from the creation of a document (e.g., the "Design and Definition" stage shown in FIG. 1) to its delivery (e.g., the "Assembly and Output Optimization" stage shown in FIG. 1). In an enterprise computing environment, the creation of a document may begin with the creation of a document type. For example, DA 100 may include a design tool (e.g., "Design Center," "StoryTeller," "StoryBoard," "Supervisor," etc. which can be represented by enterprise application(s) 110 in FIG. 1) that provides the capabilities needed to develop all the settings and parameters for collecting, composing, presenting, and managing customer communications, including connecting to source applications, identifying/extracting input data; transforming, formatting, processing, and sorting data, and delivering output to the appropriate device.

Using such a design tool, a user (e.g., a document designer) can create a master template for each document type. A template for a particular document type may define all elements of a document of that particular type such as the structure, page design, and layout, and include logos, color, standard information such as name, date, and address, etc. Depending upon document type, a template may additionally define multi-columns, paths for variable data, variable images, charts, graphs, complex tables, complex presentation logic, and so on. The design tool may be a web-based service provided by DA 100. With defined document types, enterprise users in various roles (e.g., manager, reviewer, writer, etc.) can create, manage, and distribute documents through DA 100.

A system implementing DA 100 can be characterized as a high capacity, high speed data transformation system, processing millions and billions of documents a year. Previously, documents may be processed via uniquely programmed data streams, an example of which is described in the above-referenced U.S. Pat. No. 7,127,520. Specifically, input data of a particular format is broken apart using a filter to recognize events within an input data stream. A message generator is configured for generating messages from the events. A processor processes the messages to generate meta-records that include unformatted data (not formatted for any specific output device). A formatter formats the meta-records for an output data stream. As discussed above, this solution involves the use of a queue to store the input data stream and the use of job threads that can handle input data streams in parallel. The messages themselves, however, were not persisted.

In the above-referenced U.S. Pat. No. 8,914,809, such messages can be persisted. Specifically, input data streams can be processed to parse out messages. A parsing model may be defined to break apart and reformat the messages. The messages can be persisted in a message store and used to generate different alterations of the input data streams, for instance, by concatenating messages from different input data streams to generate output message instances. The output message instances can then be provided to one or more downstream processors. This solution decouples input data stream processing from output data stream processing and allows for autonomous storage and alteration of messages generated when processing a data stream of a first format to transform it into a second format.

Figure 2:
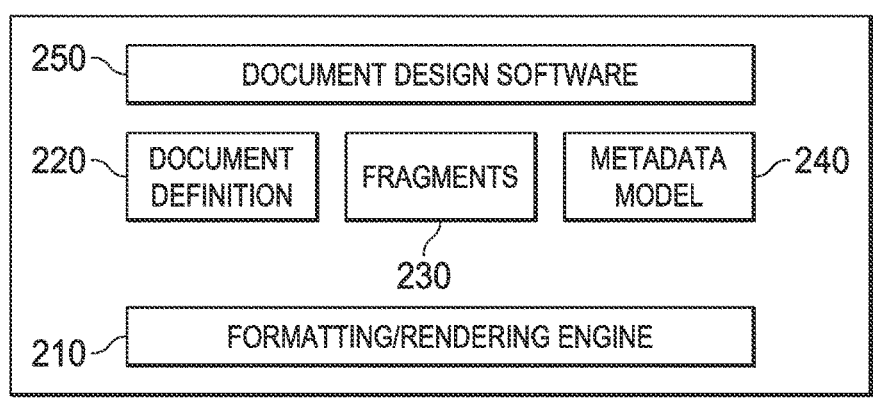
FIG. 2 depicts a diagrammatic representation of example features of the document architecture shown in FIG. 2.

A new and improved DA described herein can efficiently store formatted data with significantly reduced storage requirements. To this end, in some embodiments, a system implementing the DA disclosed herein (e.g., DA 200 shown in FIG. 2) may include an engine (e.g., formatting/rendering engine 210) that can take a document definition file (e.g., document definition 220) generated by document design software or tool (e.g., document design software 250), break it apart into fragments (e.g., fragments 230), process and store the processed fragments efficiently, and utilize the processed fragments to intelligently render a document (and/or a version or versions thereof) described by an associated metadata model (e.g., metadata model 240). At runtime, properties in the metadata model can be exchanged with real customer data. Details and examples of metadata models and use cases are discussed further below.

Figure 3:
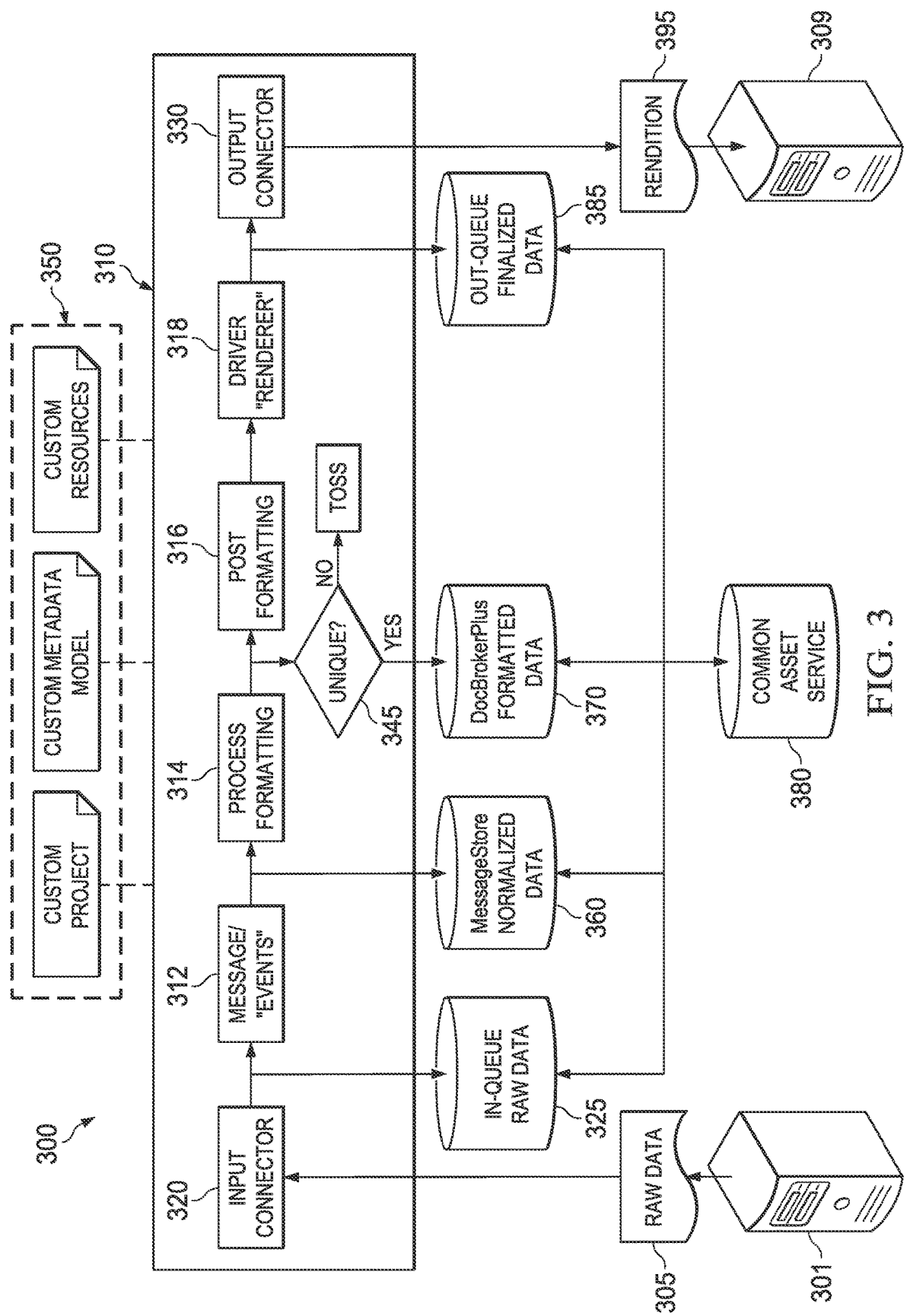
FIG. 3 depicts a diagrammatic representation of example operations performed by a formatting/rendering engine according to some embodiments.
Figure 4:
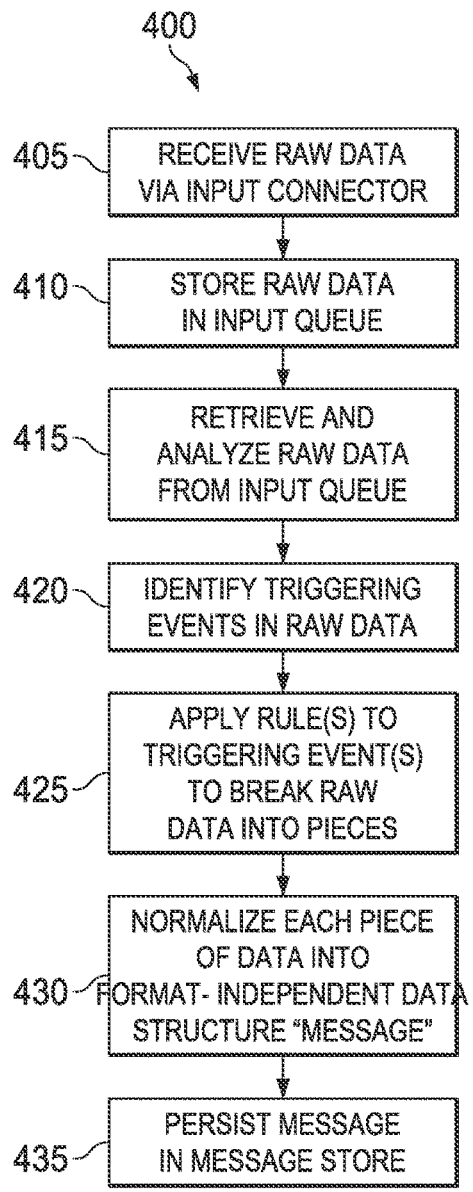
FIG. 4 depicts a flow chart illustrating an example method of efficient storage according to some embodiments.
Figure 5:
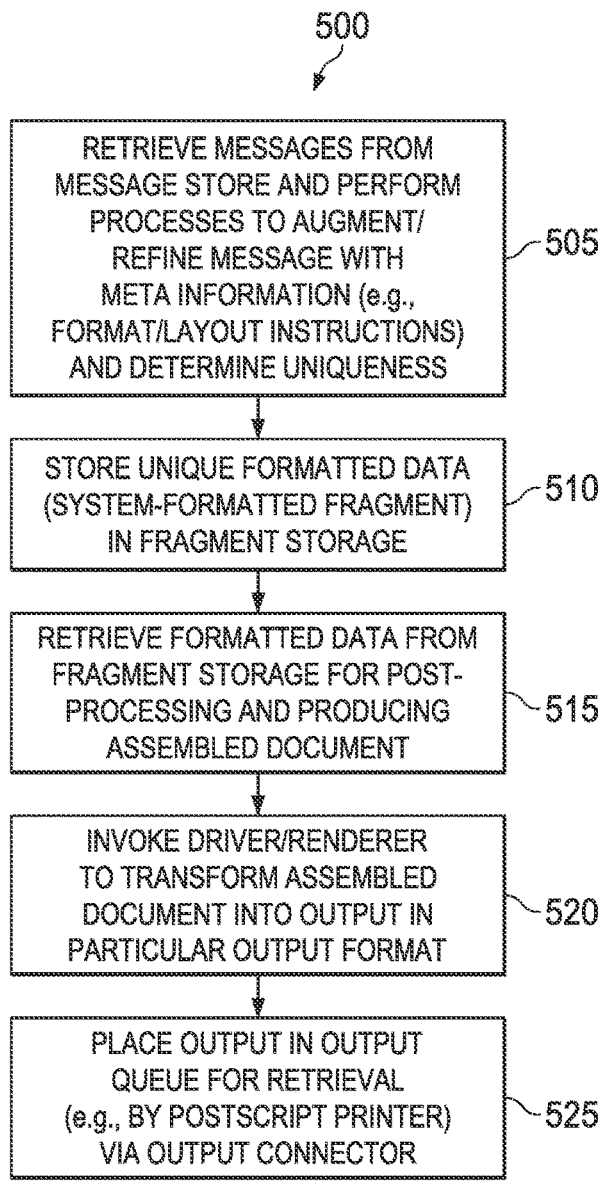
FIG. 5 depicts a flow chart illustrating an example method of smart rendering according to some embodiments.

Example operations performed by the formatting/rendering engine are illustrated in FIG. 3. In the example illustrated, DA system 300 includes formatting/rendering engine 310. In computer programming, an engine refers to a program or a group of programs that perform(s) a core or essential function for other programs. In the example of FIG. 3, formatting/rendering engine 310 is particularly equipped with a plurality of components 312, 314, 316, and 318. These components are further described below with reference to DA system 300 shown in FIG. 3, method 400 shown in FIG. 4, and method 500 shown in FIG. 5.

In some embodiments, an input connector (e.g., input connector 320, which can be one of a plurality of input connectors) communicatively connected to a data source (e.g., data source 301, which can be one of a plurality of data sources such as enterprise applications, client devices, or any external data systems or providers, etc.) can receive/accept raw input data (e.g., raw data 305) from the data source via an appropriate connectivity method and/or protocol (e.g., HTTP) (405). In some embodiments, multiple input connectors can be developed and/or customized (e.g., by third-party developers). Examples of an input connector can include, but are not limited to, a directory scanner (e.g., the directory scanner may be particularly configured for scanning a certain directory), a file system manager (e.g., the file system manager may be particularly configured for detecting any changes to and managing data stored in a certain file system), a web service with a designated HTTP port (e.g., the web service is particularly configured to "listen" and detect an incoming data stream via the HTTP port), etc.

The raw data (e.g., raw data 305 from external data sources or system(s) 301 residing outside of DA system 300) that is streamed to an input connector is in a raw, unhandled format at this point in time. Examples can include, but are not limited to, XML data, stream-based data, text-based data (e.g., data from mainframe computers which were print into ACSII format, etc.). The input raw data can include a file containing hundreds or thousands of "events" (which can be considered as unstructured messages from which structured messages, discussed below, can be constructed) and can be stored together with initial metadata in an input queue (e.g., "in-queue" 325) (410). Below is a portion of an example of raw data 305 received by input connector 320.

```
<?xml version="1.0" encoding="UTF-8"?>
<documents>
    <document>
        <enteteTechnique>
            <jobId>EVCLI_EDITIQUE_1224669972275</jobId>
            <date_emission>1224669972275</date_emissions>
            <application>SESST</application>
            <sequenceId>1</sequenceId>
            <distribution>
                <canal>http</canal>
                <pacific_emetteur/>
                <pacific_destinataire/>
                <pacific_reference/>
                <pacific_difup/>
                <pacific_profil/>
                <destination/>
                <serveur/>
                <model/>
                <copies>1</copies>
                <utilisateur>evcli</utilisateur>
            </distribution>
        </enteteTechnique>
        <gabarit nom="GAB_EVCLI_-----RDC_000004">
            <metaData>
            <lang>FR</lang>
            </metaData>
            <header>
            <account_title>BANQUE ETATS AFRIQUE CENTRALE</account_title>
            <account_domiciliation>SEGPS/SRFO</account_domiciliation>
            <account_rib>
                <code_banque>30001</code_banque>
                <code_guichet>00064</code_guichet>
                <num_compte>00000051042</num_compte>
                <cle_rib>77</cle_rib>
            </account_rib>
            <account_iban>FR76 3000 1000 6400 0000 5104 277</account_iban>
            <account_bic>BDFEFRPPCCT</account_bic>
            <account_nom1>BANQUE DES ETATS DE L'AFRIQUE</account_nom1>
            <account_nom2>CENTRALE</account_nom2>
            <account_adresse1>BP 1917</account_adresse1>
            <account_adresse2/>
            <account_cp_ville>.. YAOUNDE</account_cp_ville>
            <account_country>CAMEROUN</account_country>
            <contact>SEGPS</contact>
            <date_production>13/05/2008</date_production>
            </header>
            <commun>
                <date_periode>13/05/2008</date_periode>
                <code_flux/>
            </commun>
            <detail>

<report>
                        <num_page>1</num_page>
                    <report_debit/>
                    <report_credit/>
                    <report_solde>999.999.999.999,99</report_solde>
                    <a_reporter_debit>903.600,74</a_reporter_debit>
                    <a_reporter_credit>0</a_reporter_credit>
                    <a_reporter_solde>-903.036,68</a_reporter_solde>
                    </report>
                    <ligne>
                        <detail_date_ope>13/05</detail_date_ope>
                        <detail_date_val>13/05</detail_date_val>
                        <libelle>OPERATIONS DIVERSES DEBIT</libelle>
                        <detail_debit>999.999.999.999,99</detail_debit>
                        <detail_credit/>
                        <detail_solde>999.999.999.999,99</detail_solde>
                    </ligne>
                    <ligne>
                        <detail_date_ope/><detail_date_val/>
                        <libelle>NOTRE REF FT0733904544</libelle>
                        <detail_debit/>
```

```
<detail_credit/>
<detail_solde/>
</ligne>
```

The input queue is accessible by a document processing engine (e.g., formatting/rendering engine 310). Many suitable queuing mechanisms may be utilized. In some embodiments, the input queue may store each received data stream as a file (e.g., .xml, .txt, .log, .pdf, etc.). In some embodiments, the queued up raw input data can be read back from the input queue and analyzed by input agents or data agents (which are collectively represented by component 312 shown in FIG. 3) (415). These input agents are particularly configured for determining and handling different types of input formats, for example, XML, record stream, PDF, text pages, etc., using custom-developed configuration and handling.

For example, based on a configuration that an end user (which can be representative of an enterprise customer of DA system 300) has set up (e.g., via enterprise applications 350), an input agent can operate to pull data of a particular input format from the input queue and process the pulled (unstructured) data to find triggers (events) in the unstructured data (which is of the particular input format that the input agent is configured to process, for instance, a text input agent may operate to process unstructured text data in a text format such as .txt, .log, etc.). When an input agent identifies a known pattern (representing a triggering event) in the unstructured data (420), it can apply custom-configured logic (e.g., processing rules) (425) to the unstructured data to break it down and normalize the unstructured data into a format-independent data structure referred to herein as "message" (430). One example of a normalization process can be found in U.S. Pat. No. 7,127,520, which is incorporated by reference herein.

In this disclosure, the format-independent data structure, "message," is an internal binary representation of the input data. This internal (internal to DA system 300) binary representation allows information to be separated from layout and layout from format (e.g., XML, PDF, Word, HTML, etc.). This format-independent data structure is fully controlled by DA system 300. In the example of FIG. 3, DA system 300 would have full control of data in operations performed by formatting/rendering engine 310, between input connector 320 and output connector 330.

As an example, suppose raw data 305 includes an XML file containing tens of thousands of events (e.g., bills, invoices, purchase orders, contracts, statements, etc.). Each invoice, purchase order, contract, etc. can be identified, for instance, by a corresponding input agent utilizing a pattern matching technique. A document type may have a certain predefined pattern associated therewith (e.g., a contract pattern, an invoice pattern, a purchase order pattern, etc.). For example, an invoice may have an account number, an amount for the invoice, a due date for which the invoice is due, an address to which the invoice is to be sent, and a name to which the invoice is addressed, etc. In some embodiments, a sample of a pattern may be provided (e.g., by a customer from which an input data stream is originated and streamed to DA 300 for processing) and an input agent can be trained or configured to recognize the particular pattern in the raw data.

The input agent can be particularly configured to identify, per the document type, a triggering event that signals the beginning of an unstructured message (e.g., a bill) that was in the original data stream a trigger event that signals the end of the message, and any event in between (e.g., a customer's name, a billing address, a telephone number, an amount billed, a due date, etc.). At this point, a particular portion of data is isolated from the raw data and the system does not yet have any knowledge as to the layout, style, or format of the portion of data isolated from a (potentially huge) amount of data.

In some embodiments, the input agent (e.g., component 312) may operate to extract pieces of information from the isolated portion of the raw data and generate a message with the specific information of that invoice. In some embodiments, the input agent may apply particularly configured processing rules to the raw data, for instance, to identify a certain pattern representing a trigger event (e.g., a rule may specify that if "" is found in an input file, look for a set of metadata in "" and generate a message containing the set of metadata for ""). In some embodiments, rules can also be used to construct messages. For example, a rule may specify that if a first name is found in proximity of a last name in the unstructured data, then they should be put together as a name and stored in the message under the key or attribute "name." Additionally or alternatively, a message broker, such as one disclosed in the above-referenced U.S. Pat. No. 8,914,809, can be used to break down the raw data into the normalized structure and apply different rules to construct messages.

In DA system 300, such a message can be stored, together with custom metadata describing the message, in memory or in a data storage referred to herein as a message store (e.g., message store 360) (435). At this point, all the functions of DA system 300 are available to process messages stored in message store 360, regardless of data source(s) 301 from which the messages were generated.

In some embodiments, message store 360 can be particularly configured such that any downstream component (e.g., process formatting 314) can fetch data ("messages") from message store 360 based on metadata. Breaking down the raw data into messages allows documents to be assembled, put together in an efficient and intelligent way, utilizing data stored in message store 360 and/or data stored in document broker plus storage 370.

In some embodiments, a message can be stored as a row or entry in a database. In some embodiments, queue 325, message store 360, document broker plus storage 370, and/or out-queue 385 may utilize the same data storage mechanism (or document abstraction), for instance, one message per a row, one fragment per a row, one queue item per a row, etc., each with metadata attached thereto (e.g., for an invoice message, the metadata might include invoice number, delivery address, due date, etc. which can be completely customizable). The database can be queried using the same query language and multiple rows (associated with multiple messages) can be associated this way (e.g., "find all statements for account number=555").

In this disclosure, what constitutes a message can be customizable depending upon needs and/or applications and may vary from customer to customer (of DA 300). As non-limiting examples, a message can represent a bill, an invoice, a purchase order, a statement, a page, a report, a section of a page, a contract, a contract clause, etc. In some embodiments, the header information in raw data 305 can be used to determine applicable output channel(s) (e.g., an HTTP channel) and use that information to determine how the final output should be rendered and delivered.

Using the sample portion of raw data 305 received by input connector 320 provided above as an example, a message may correspond to an isolated <detail> portion, an isolated  portion, or an isolated <report> portion. The database row for the message would contain the data extracted from the corresponding isolated portion and a pointer that points to the actual data (which, in one embodiment, can be persisted, for instance, in a directory or file system, after it has been processed by component 312).

In some embodiments, messages (normalized data) can be read from message store 360 and processed by one or several processes (which are collectively represented by component 314 in FIG. 3) based on custom configuration(s) (e.g., via enterprise application(s) 350) (505). In this disclosure, a process refers to a document configuration/service that transforms message data into formatted data.

As a non-limiting example, a process performed by component 314 could involve a designer using a Design Center or StoryTeller tool to create a document layout (e.g., in a custom project of enterprise application 350) where the designer decides what image or video or text should be where in a document, whether a table or a chart should be included and where it should be placed, what line should be drawn where, what logo to use and where to place it, etc. In this way, a template can be dynamically built based on the (normalized) input data. It could also involve aggregating information for a specific customer account, for instance, all the order information needed to fill a table. It may include calculating the data (e.g., running scripts calculating a due date as "today plus 30 days," calculating a payment amount, etc.). It could include getting additional facts from external systems. Enormous potential at this stage to extend the (message) normalized data into formatted data with even more information and enrich dynamic documents such as HTML5, JavaScript, etc. Component 314 may operate to tie a message to certain formatting and/or layout information/instructions. Virtually an unlimited number of processes (e.g., page formatting, print optimization, etc.) may be added and the user can query message store 360 for desired information (e.g., fetch all accounts that are in the Northwest region). Some processes may be purely data-driven and some may produce template-based outputs. This unprecedented processing flexibility is possible because details about the look and feel of all the data thus formatted are known to and controlled by DA system 300. For the sake of convenience, "fragment" is used herein to refer to formatted data.

Formatted data could be anything from fully formatted page/unpaged output (documents) to XML, HTML and record-based stream output. Fragments of documents (formatted data) created by the processes are still not the "real" documents since the "rendering" has not yet been done. This means that the formatted data being processed is still in a presentation-independent format fully controlled by the DA system. The formatted data may be checked for uniqueness (discussed below) and stored together with custom metadata (meta information) in a fragment storage (e.g., document broker plus storage 370) (510). Such custom metadata can include any formatting, style, and/or layout information such as placing a text field at the upper left corner of a document, adding a watermark on a specific page, including a specific contract clause or a claim type in the document, adding an image at the bottom of a window, applying a color to a logo position to the upper left corner of the document, adjusting the size of the window, using a particular style of a table in the document, preparing the document for a laptop or a mobile phone, etc. Skilled artisans appreciated that these non-limiting examples are meant to be illustrative and that other use cases may be possible to store document fragments and their references to resources.

To illustrate a difference between messages (normalized data) stored in message store 360 and fragments (formatted data) stored in document broker plus storage 370, consider a use case in which a billing address is changed and a use case in which a new account is added to the billing address. For the first use case, an authorized user (e.g., a user of enterprise application 350) may access message store 360 to query any message containing the billing address and update the billing address accordingly. For the second use case, the same or different user may access document broker plus storage 370 and query all account levels associated with the billing address and generate a single bill for the billing address, with the new account added to the bill.

In some embodiments, the same message containing the billing address can be used in both use cases, but for different purposes. In some embodiments, a message only needs to be stored once and can be used and reused virtually unlimited times for various reasons. In the second use case, a fragment stored in document broker plus storage 370 can add another layer of abstraction to the message, which is stored in message store 360.

Note that a one-to-one relationship between a message stored in message store 360 and a fragment stored in document broker plus storage 370 is not required. For example, a fragment (which may contain format, style, and/or layout information, rules, and/or instructions that can be used or consumed by a downstream component such as driver or "renderer" 318) may be constructed using multiple messages stored in message store 360 and a message stored in message store 360 may be used by multiple fragments stored in document broker plus storage 370.

In some embodiments, messages can also be stored (as part of some fragments) in document broker plus storage 370. In some embodiments, instead of being physically incorporated, the fragments may reference the messages (e.g., a fragment may reference one or more messages).

In some embodiments, DA 300 can be optimized to store each message only once.

For example, a company's logo would only need to be stored as a unique message once and the message can be included in all of the documents generated for that company. In some embodiments, message store 360 may allow for duplicate messages to be stored therein.

A message stored in message store 360 does not have any format, style, or layout information. In some embodiments, additional information (e.g., sizes, colors, styles, fonts, etc.) relating to the presentation of a "document" (yet to be assembled and rendered) can be added by component 314 and/or component 316 and then rendered by component 318.

In some embodiments, formatting/rendering engine 310 may receive presentation information (e.g., document themes, for instance, branding, seasonality, environmental-friendly look and feel, etc.) through common asset services 380. In some embodiments, common asset services 380 may provide other types of information, for instance, data for premium service subscribers versus data for standard service subscribers, data for different geographic locations, etc. In some embodiments, a new row in document broker plus storage 370 (a fragment) may be created by querying message store 360 (to obtain relevant message(s)) together with a set of rule(s), and perhaps adding information received via common asset services 380. At this point, the fragments still do not resemble the final documents.

In some embodiments, DA 300 can be optimized to store each fragment only once. This can be done, for example, via programmatic logic 345 particularly configured for determining, prior to storing a fragment in document broker plus storage 370, whether the fragment is unique (and has not been seen by programmatic logic 345 before). In some embodiments, programmatic logic 345 may be implemented as a part of component 314 and of a store layer that stores an outcome (formatted data) from component 314 in document broker plus storage 370. In some embodiments, programmatic logic 345 may be configured for applying a hash function to a fragment to generate a hash and compare the hash with hashes stored in a hash table or some data structure to determine whether an identical fragment already exists in document broker plus storage 370. As a non-limiting example, programmatic logic 345 may apply a cryptographic hash function to a fragment to generate a checksum. Prior to storing the fragment in document broker plus storage 370, the fragment's checksum can be compared with one that was previously generated for another fragment that had already been processed and stored in document broker plus storage 370. If the two checksums agree, there is no need to store two copies of the same fragment.

Such a mechanism can also be used to check for authenticity. For example, in some embodiments, programmatic logic 345 may include a security mechanism in which a cryptographic function can be applied to a fragment or a set of fragments (e.g., a row or multiple rows in document broker plus storage 370 associated with a document or a section thereof) to generate a signature for the fragment or the set of fragments. The signature can be stored with the fragment or the set of fragments so that, on retrieval, it can be used to compare with another signature generated at output time. If there is no difference in the signatures (or the checksums), the digital signature (or checksum) can serve as proof that the fragment or the set of fragments is genuine and had not been altered.

As the amount of documents under processing can be in the millions, such an efficient storage mechanism can significantly reduce the amount of data storage required. As the operation of formatting/rendering engine 310 progresses downstream (e.g., for a processing job), more layers of abstraction can be added to produce different types of documents and various versions thereof, as further explained below.

In some embodiments, fragments (formatted data) can be read from the fragment storage (e.g., document broker plus storage 370) and further processed based on custom configuration used by one or several post formatting components (which are collectively represented by component 316 in FIG. 3) (515). For example, post formatting component(s) 316 may run the retrieved formatted data through one or more transformations into a final document, making sure that resources are correctly organized, fonts are embedded in the file format, getting an image or video where needed, the final format is the correct format (e.g., for mailing, emailing, printing, faxing, or any output channel), the final size is the correct size, the resolution is appropriate for the output channel, and so on. In some embodiments, the output from post formatting component(s) can be passed directly to a driver or renderer (which is represented by component 318 in FIG. 3) that renders the formatted document into the final form/size (520). In some embodiments, the output from component 316, which can be even closer to the final output than fragments, may be stored in yet another data storage (not shown in FIG. 3). In some embodiments, the driver may render the output from component 316 into a device specific format (e.g., PDF, PCL, AFP, PS, DOCX, HTML, Barcode printer formats, etc.). The final stream is stored together with custom metadata describing the rendered, finalized data (e.g., rendition 395) into an output queue (e.g., out-queue 385) (525).

In some embodiments, the finalized data can be read (e.g., by output connector 330) from the output queue and delivered via configured output delivery channel(s), for instance, to device(s) 309 using appropriate connectivity methods and protocols (e.g., to a postscript printer via a custom output connector for the postscript printer), as those skilled in the art can appreciate.

As discussed above, the normalization and formalization into a final output can be processed in several steps. The "process" (or job) can be restarted at any point of the storage steps and there could also be possibility to merge data between the different steps based on configuration and metadata. This provides DA 300 with capabilities to change/reformat/re-render the document based on custom logic and changes.

Figure 6C:

FIGS. 6A-6C depict diagrammatic representations of example versions of a document rendered from fragments augmented with rich information. As illustrated, rendered documents 600, 601, and 603 represent billing statements for different customers of a company. Digital documents 600, 601, and 603 have a similar look and feel and are enriched with various features that can improve user experience. For instance, documents 600, 601, and 603 all have "Pay Now" button to encourage fast payment. However, documents 601 and 603 are missing section 610 where certain information shown in document 600 is blocked from view.

Because these documents are assembled from fragments as described above, the system can intelligently and dynamically determine that viewers of documents 601 and 603 do not need to view this section and block out section 610. The missing data (e.g., in a blocked out section) is not lost, just hidden from those who are not supposed (e.g., not relevant or not authorized) to view the missing data. The system has the ability to white out or black out or replace or re-arrange the information and layout when re-rendering. There could be various reasons for rendering/re-rendering a document into different versions. For instance, the system may determine that a type of output device or a target device for document 603 does not support videos and replace a video with an image when rendering document 603.

Figure 6D:

In addition to rendering a document in different formats (e.g., PDF, docx, HTML, AFP (Advanced Function Printing), etc.) tailored to various output devices, the system can render a document in different formats tailored to different viewers (e.g., "person with bad eyesight on a tablet." or "people over 70 get a bigger font."). This can be done by enabling/disabling a section/feature associated with a fragment. For example, an audio readout function may be embedded to read out the text in a particular section. This has a technical effect of eliminating the need to read out the entire document when only a portion may be needed or important to a user. Furthermore, the system may embed an electronic version of data (XML) targeted for automated systems such as one used in a vehicle. Different users of different roles may place different fragment(s) in a section and/or modify different sections of a document for various reasons. For example, as illustrated in FIG. 6D, a first user from the accounts payable user group may be responsible for section 620 which shows an account balance and payment information; a second user from the billing department may be responsible for section 630 which shows the billing information and timeframe; and a third user in marketing may be responsible for adding a promotional video in section 640. As explained below, whether a user can view and/or edit a fragment in a section of a document may depend on that user's role relative to that section, as specified in an access control list (ACL) for that section. Another feature is that a signature (which can be generated using any suitable signature generation technology) may be embedded in the document to guarantee that the included content is authentic.

In this way, the system can provide customized layout and information based on rules/roles and easily change content and re-render (e.g., due to a new logo, new font, new legal text, new company address in a footer, etc.). Because the system has full control and knowledge of the fragments and how they are used, the system can perform analytics. Example analytics may include computer operations to analyze performance and utility of fragments in various scenarios. For instance, how many times a fragment is used to produce how many documents within a period of time. Some analytics may focus on user behavior (e.g., who a user is and how that user views the documents). This ability can be applied to invoices.

The system can generate a document definition of a document genus. This document definition includes information on the different fragments of the document genus, and may include configuration information such as an arrangement of the fragments. A document definition can include indication of a subset of fragments that are required in each document version, as well as those that may be left out or "blanked out." For example, a fragment containing a function to drill down on financial information may be used in a desktop version, but not in a mobile client version.

The configuration information contained in a document definition may include references or links to certain fragments. As described above, a document may not be "finalized" until during a rendering process, which may include determining which fragment (i.e., a final image) to include in the document, based on the device type, user role, context, etc.

The document definition feature has utility over the "lifetime" of a document. For example, document authors may need or desire that four essential parts of the document be included and rendered in each document version of the genus. However, another part of the document may be solely dependent on a specific time/date, so it only needs to occur in a species version of the document. In this example, the document definition can be used to render the document, each time guaranteeing that the four essential pieces (representative fragments) are included, but not necessarily the one time-specific fragment.

Essentially, a fragment is stored once and used many times at rendering time. This has a technical effect of allowing the system to store documents in an extremely efficient manner. To illustrate, FIG. 7A depicts a diagrammatic representation of an example document in a conventional archive format. Suppose document 700 has a size of 240 KB in a rendered format (e.g., TIFF). In this example, the 240 KB file size is due to some media files (e.g., ad image 710, interactive graph 715, ad image, 720, and video 725) included in document 700. Without having to actually include these images, document 701 of FIG. 7B is only 44 KB—a 5.5 times saving in storage space. With the improved DA disclosed herein, a system can break a document design down into fragments and store the fragments in the internal binary representation and corresponding instructions need to take the fragments and render them in a representation according to a layout (e.g., invoice 730). This is a substantial saving in storage space and can be particularly advantageous in a cloud computing environment due to the relatively expensive cost of cloud storage.

Similar to FIGS. 6A-6D described above, the system may render these documents to suit different roles, devices, rules, or even network connectivity and/or bandwidth. For example, when the system detects that a network connection is sufficient for a full bandwidth rendition, the system may render a rich document 701 that is assembled from fragments enriched at rendering time with various features such as ad image 710, interactive graph 715, ad image, 720, and video 725. Additional features may also be added, for instance, charts, chap app, etc., at rendering time. Alternatively, as illustrated in FIG. 7C, the system may render document 703 with no image data such that the system can perform better when the bandwidth is low.

Figure 8:
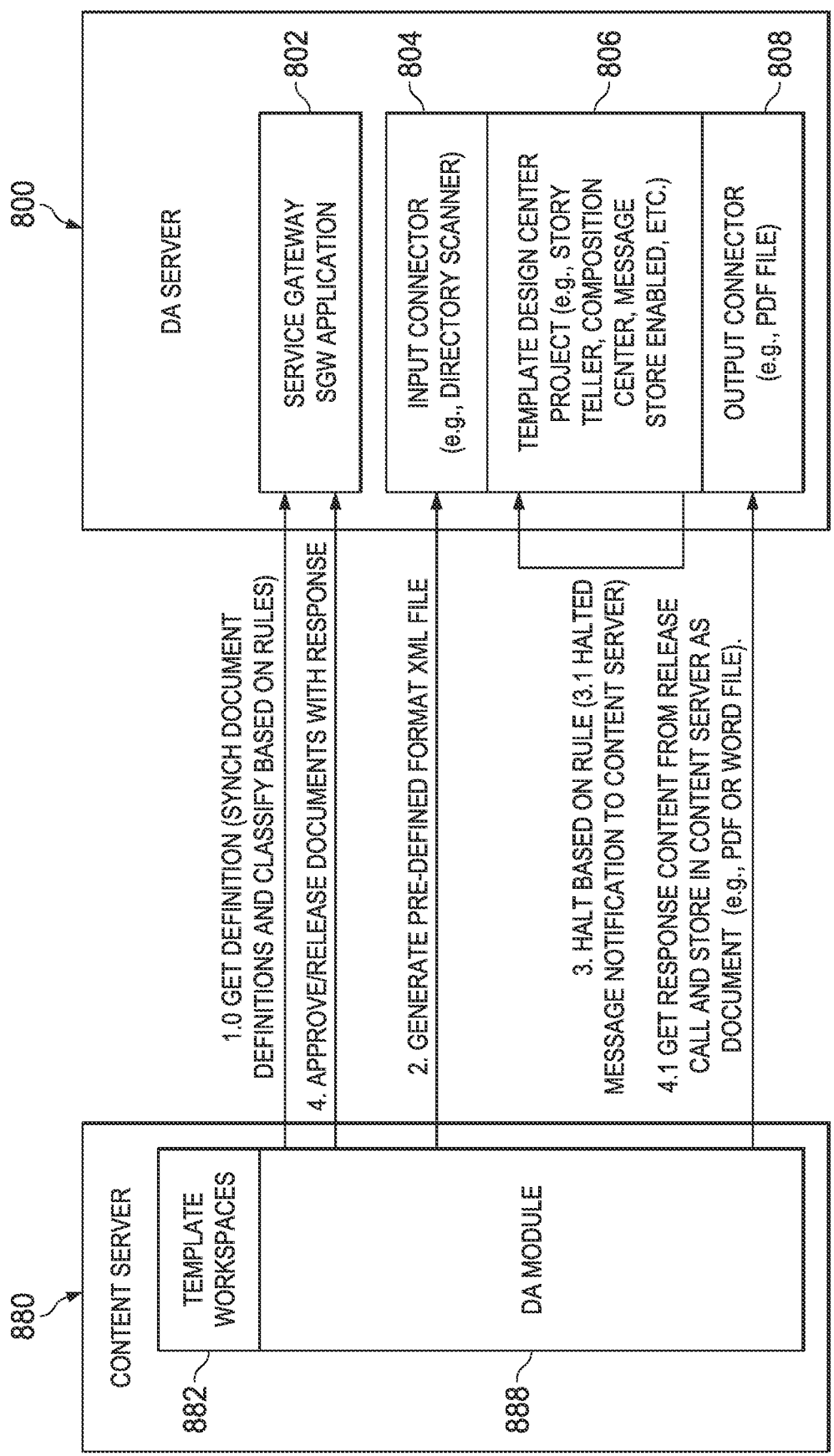
FIG. 8 depicts a diagrammatic representation of an example integration of a content server and the document architecture disclosed herein according to some embodiments.

In some embodiments, the DA described above can be integrated with one or more commercially available enterprise systems (e.g., enterprise applications, third-party applications, etc.). FIG. 8 depicts a diagrammatic representation of an example of integrating content server 880 and DA server 800 according to some embodiments.

In the example illustrated in FIG. 8, content server 880 may provide template workspaces 882 where a user can define/design templates of document types. Content server 880 may support integration of message-based documents and user interface (UI) integration of Ad Hoc Editor for generation of document definitions. New DA application programming interfaces (APIs) may allow DA module 888 running on content server 880 to communicate with components of DA server 800 (e.g., service gateway (SGW) application 802, input connector 804, and output connector 808). For example, DA module 888 may communicate a document definition from content server 880 to SGW application 802 (which, in one embodiment, may run at the application layer as enterprise applications 305 shown in FIG. 3). In some embodiments, input connector 804 may operate the same or similar way as input connector 320 described above; component 806 may implement an embodiment of document processing engine 310 described above; and output connector 808 may operate the same or similar way as output connector 330 described above. However, in this example of integration, these components may be particularly configured to work in concert with content server 880. For example, input connector 804 may be particularly configured for scanning a directory or repository that is managed by content server 880; component 806 may be configured with rules specific to content server 330 (e.g., as illustrated in FIG. 8, processing by component 806 may be halted based on a rule associated with content server 880); and output connector 808 may be particularly configured for communicating outputs from DA server 800 to content server 880 (or to a directory or repository managed by content server 880).

In this way, the DA APIs can facilitate the control of Ad-Hoc generation of documents, creating, reading, and releasing. A user (e.g., a content server user working with an Ad Hoc contract document) may wish to re-generate an old contract because some information (e.g., a legal clause) has changed since it was originally created.

In some embodiments, the system can highlight to an end user (e.g., a recipient of the contract) of the changed information. New versions of the contract can be stored, by the content server) in a data storage (e.g., storage device 309 shown in FIG. 3) managed by content server 880 for all affected documents and events and analytics on changes can be made. Such regeneration may also be referred to herein as smart re-rendering. Smart re-rendering is further explained below.

Figure 9A:
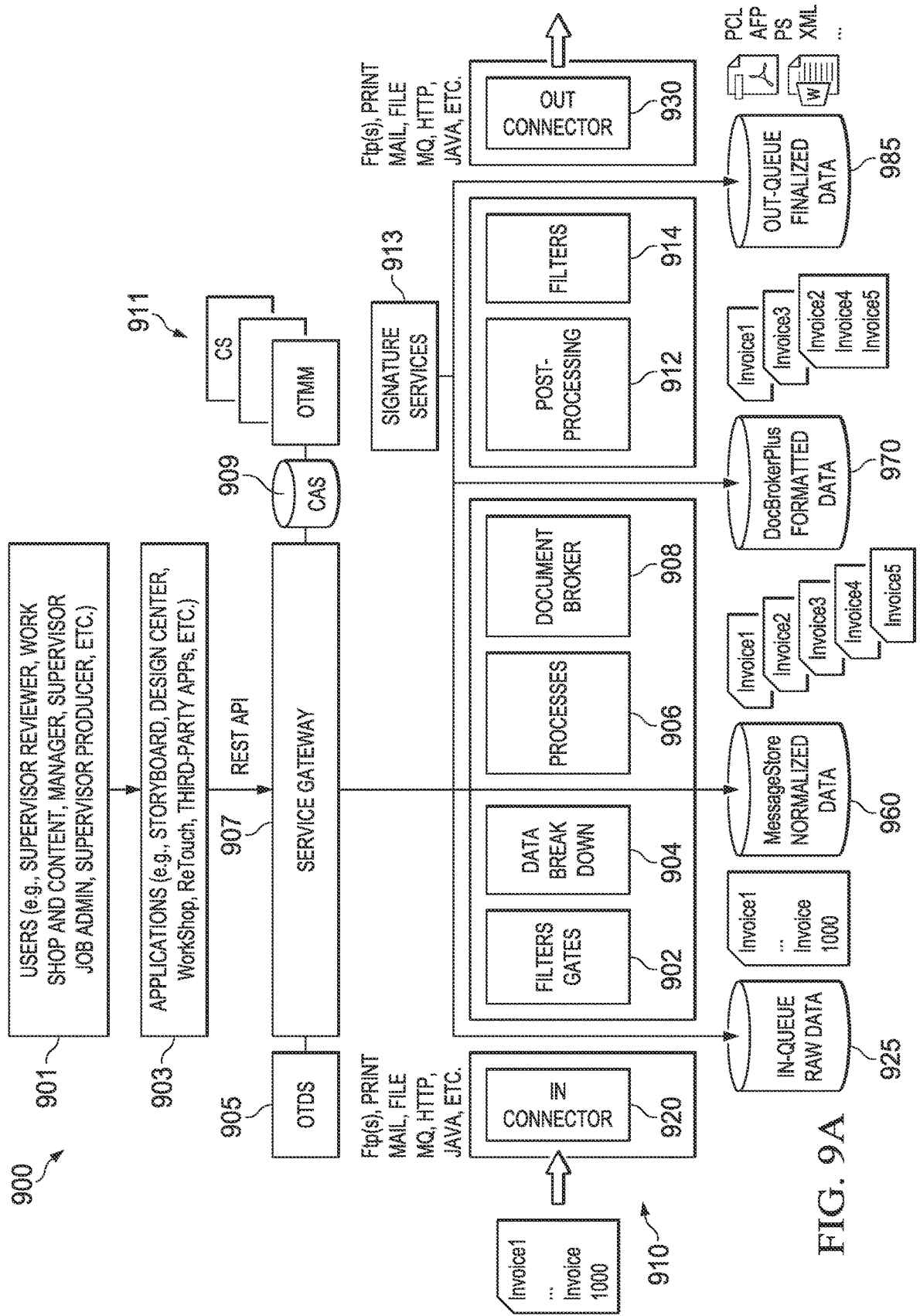
FIG. 9A depicts a diagrammatic representation of another example document architecture according to some embodiments.

Skilled artisans appreciate that embodiments of the DA disclosed herein can be implemented in many ways. FIG. 9A depicts a diagrammatic representation of another example DA according to some embodiments. DA system 900 may be similar to DA system 300 described above.

In the example of FIG. 9, DA system 900 may be communicatively connected to client devices over a network. Hosted services (e.g., Open Text Directory Services (OTDS) 905, common asset services (CAS) 909, document asset services (DAS), etc.) and resources (e.g., CAS resources, templates, etc. which, as illustrated in FIG. 9A, may be managed by information management system(s) 911) may be accessible over the network by these client devices via service gateway 907. Various types of users 901 may have various types of applications 903 running on their devices. These applications may communicate with DA system 900 via a public REST API to service gateway 907. Similar to DA system 300, DA system 900 may include formatting/rendering engine 910 that has full control of data in operations performed between input connector 920 and output connector 930.

In some embodiments, formatting/rendering engine 910 may include components similar to those of formatting/rendering engine 310 described above. For example, subcomponent 902 may read raw data from in-queue 325, use filters to identify data of interest (e.g., invoices 1 . . . 1000) from the raw data (e.g., a file streamed to DA system 900 via input connector 920) and have subcomponent 904 breaking down the data of interest (e.g., into individual invoices 1 . . . 1000) to generate messages that can then be stored in message store 960, similar to the functionality of component 312 described above.

The stored messages can be read by subcomponent 906 (which, in this example, comprises a plurality of processes) and processed by document broker 908 into formatted data (fragments representing messages augmented with additional information such as layout information, format information, style information, print optimization, etc.). The fragments can be stored (e.g., by a programmatic logic similar to programmatic logic 345 described above) in document broker plus storage 970. As described above, there need not be a one-to-one relationship between messages stored in message store 960 and fragments stored in document broker plus storage 970. For example, a fragment stored in document broker plus storage 970 may reference multiple messages (e.g., representing invoices 3-5 in the example shown in FIG. 9A). In some embodiments, only unique fragments are stored in document broker plus storage 970. This can be achieved by utilizing a programmatic logic similar to programmatic logic 345 described above.

In some embodiments, fragments stored in document broker plus storage 970 can be read by post processing 912 and various filters 914 may be utilized to assemble or otherwise prepare delivery-ready documents and/or variations of documents which, as illustrated in FIG. 9A, can be stored in out-queue 985. In some embodiments, signature services 913 may be utilized to provide an additional security measure. For example, signature services 913 may generate a signature for a fragment (or a set of fragments) and compare the signature with the one stored with the fragment (or the set of fragments). If the two signatures agree, this means that the fragment (or the set of fragments) has not been altered during processing by formatting/rendering engine 910.

According to one embodiment, when a document is assembled, document data for the document can be stored in output queue 985 that includes pointers to all the fragments that were assembled to make up the document. In addition, signature services 913 can generate unique signature for the assembled document, which may be a signature of all the content that makes up the document. Signature services 913 can store the signature in the document data for the document. The system may also store a copy of the rendered document (e.g., if the document is a .pdf document, the system stores a copy of the .pdf).

During archiving, DA system 900 can analyze the document data, identify all the discrete pieces of content that make up the document and archive the document frame, discrete pieces of content, signature and/or a copy of the rendered document. The document signature can be used at a later date to verify the document content or copy of the rendered document has not been altered.

Figure 9B:
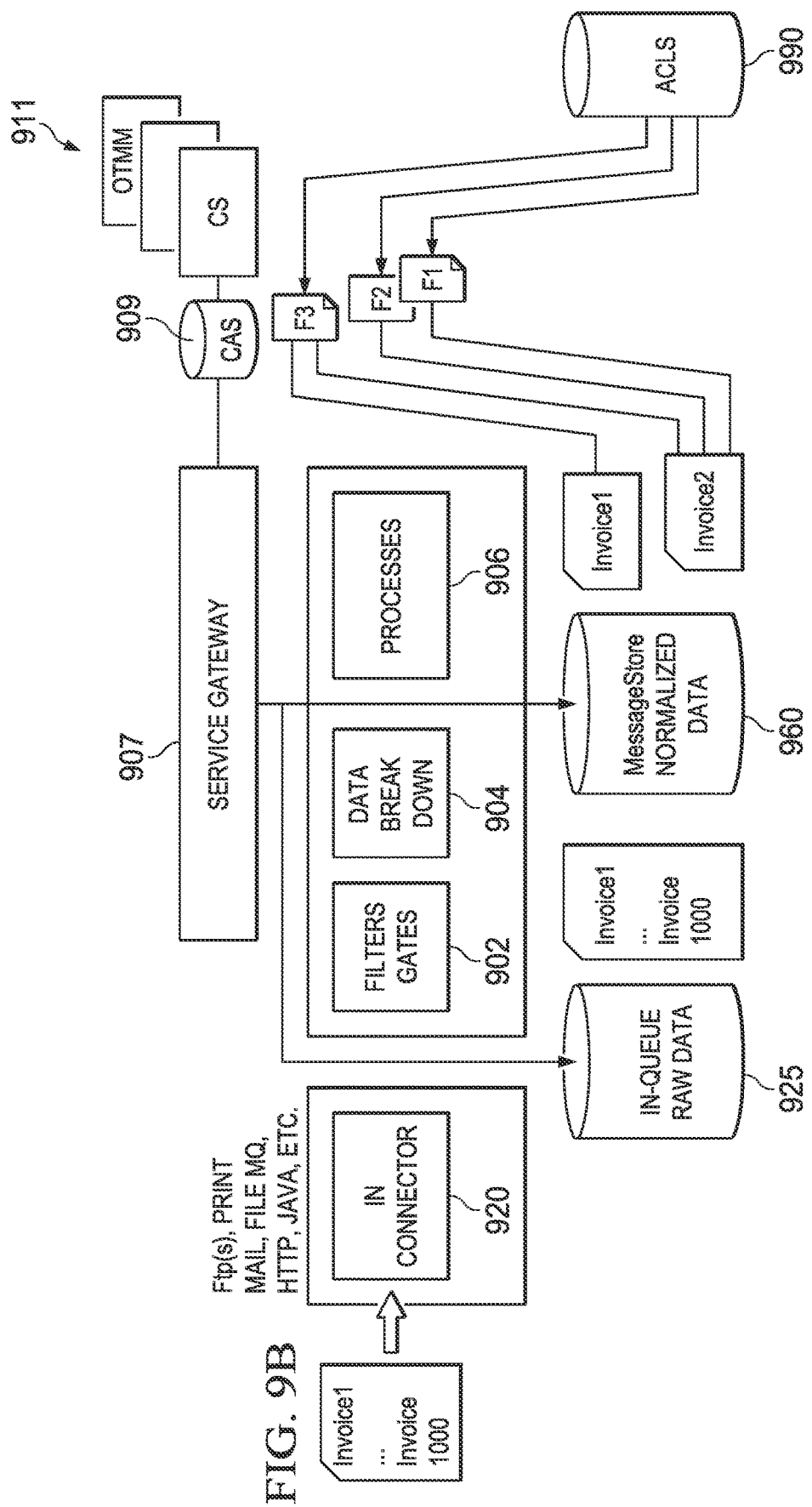
FIG. 9B depicts a diagrammatic representation of a portion of the example document architecture of FIG. 9A with additional details.

FIG. 9B depicts a diagrammatic representation of a portion of DA system 900 of FIG. 9A with additional details. As described above, a system implementing the DA disclosed herein has full control of messages stored in the message store. These messages can be augmented, extended, or otherwise refined with additional information/instructions and stored as formatted data (fragments). In some embodiments, such fragments may be stored in CAS 909 and referred to as CAS resources.

As illustrated in FIG. 9B, fragments (e.g., F1, F2, F3) can be retrieved from CAS 909 and used to assemble documents based on instructions associated therewith. As described above, a message can be created once and used multiple times. Likewise, a fragment can reference one or more messages. In this example, a message (Invoice 2) is referenced by multiple fragments and a fragment (F3) references multiple messages (Invoice 1 and Invoice 2). A document may be assembled using one or more fragments. After the document is assembled, the system invokes a driver/renderer to produce an output (e.g., a version of the document) in a desired format. Whether a section of the document that contains one or more fragments is rendered as read-only or editable may depend on an ACL associated therewith. Further, during rendering, a fragment may be included in a section or excluded from a section, depending upon whether an intended recipient of the document has at least a view permission as specified in an ACL associated with that section. Such an ACL may be retrieved from ACLs data storage 990.

Figure 10:
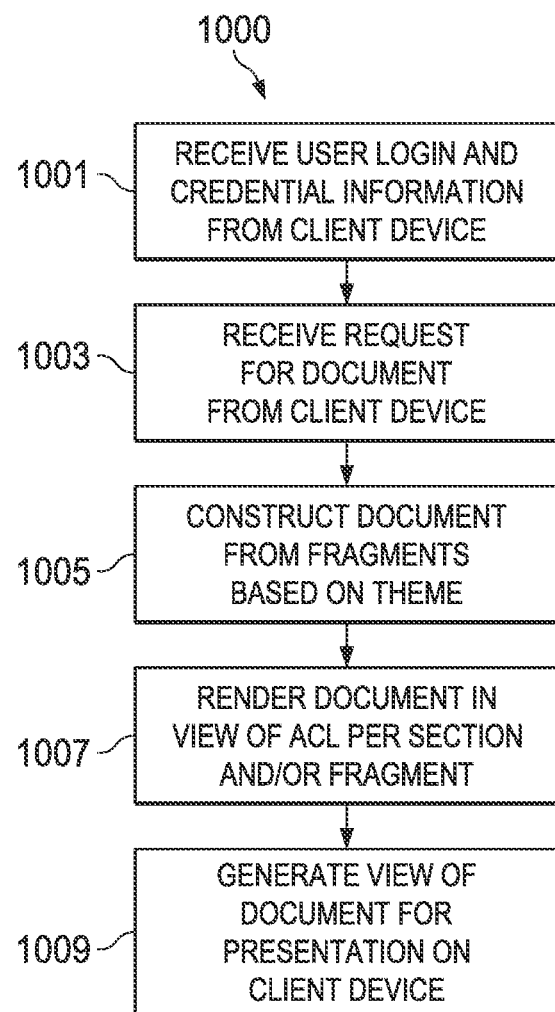
FIG. 10 depicts a flow chart illustrating an example method of document production with granular access controls according to some embodiments.

FIG. 10 depicts a flow chart illustrating an example method of document production with granular access controls according to some embodiments. In some embodiments, method 1000 may be implemented at a server computer of DA system 900. The server computer may be communicatively connected to a resource repository, a client device, and a network. Method 1000 may comprise receiving user login information from the client device over the network (1001); receiving a request for a document from the client device (1003); and constructing the document from fragments based on a theme associated with the document (1005). In some embodiments, the constructing may comprise retrieving, from the resource repository, the theme, the fragments associated with the theme, and meta information that describes the document. As explained below with reference to FIGS. 11A-12E, the theme may contain one or more sections, each of which may have an access control list associated therewith. The access control list may specify at least one role-based user group and at least one permission for the at least one role-based user group.

The constructing may further comprise evaluating rules applicable to the document, which may include application of access control list(s) to the one or more sections of the theme. The evaluation may include determining whether a user identified by the user login information received from the client device has permission to view or edit a section of the theme. The document is then assembled using the fragments and the meta information in accordance with the rules. At rendering time (1007), a section, and thus any fragment contained therein, may not be included in the document if the user does not have at least a read permission to view the particular section. If the user is permitted to view, but not edit, a section, that section is rendered as a view only section. If the user is permitted to view and edit a section, that section is rendered as a user-editable section.

A view containing the rendered document is then generated (1009) and communicated to the client device over the network for presentation on the client device. When an editable section is modified (e.g., a new fragment is inserted, an existing fragment is deleted, etc.), the section is dynamically updated to reflect the edit in real time. In some cases, this may entail dynamically rearranging fragments, re-rendering the document, generating an updated view, and displaying the updated view (e.g., in a print mode or a web pre-view mode) on the client device.

FIGS. 11A-11E depict diagrammatic representations of an example user interface of an example application with which a fragment can be created and edited within a section of a theme according to some embodiments. In this example, application 1100 may be an application configured for communicating with a system implementing the DA disclosed herein (e.g., DA system 900 shown in FIG. 9A). Application 1100 may include user interface 1110 and tools 1130 accessible via user interface 1110.

Figure 11A:
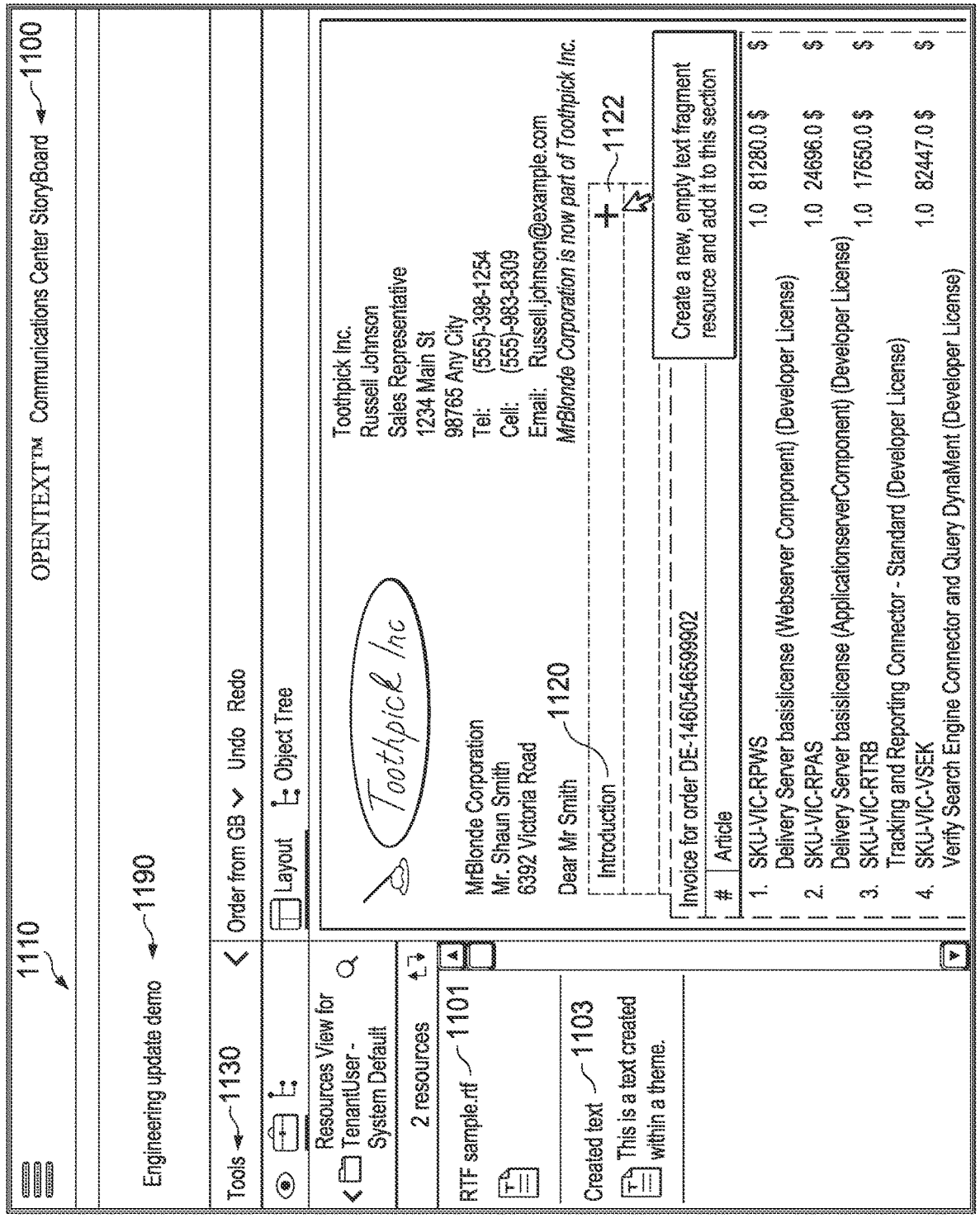

In FIG. 11A, a resources view and a layout view of theme 1190 are displayed via user interface 1110 on a client device associated with an authorized user of a tenant of the system. In this example, the resources view shows two resources (fragments 1101 and 1103) are associated with theme 1190. The user can navigate to the layout view and, as the user's pointing device hovers over the layout displayed in the layout view, individual sections are highlighted with their boundaries. Each section when highlighted may display an icon, image, or button referencing a fragment creation function. In this case, section 1120 is highlighted, showing button 1122.

Figure 11B:
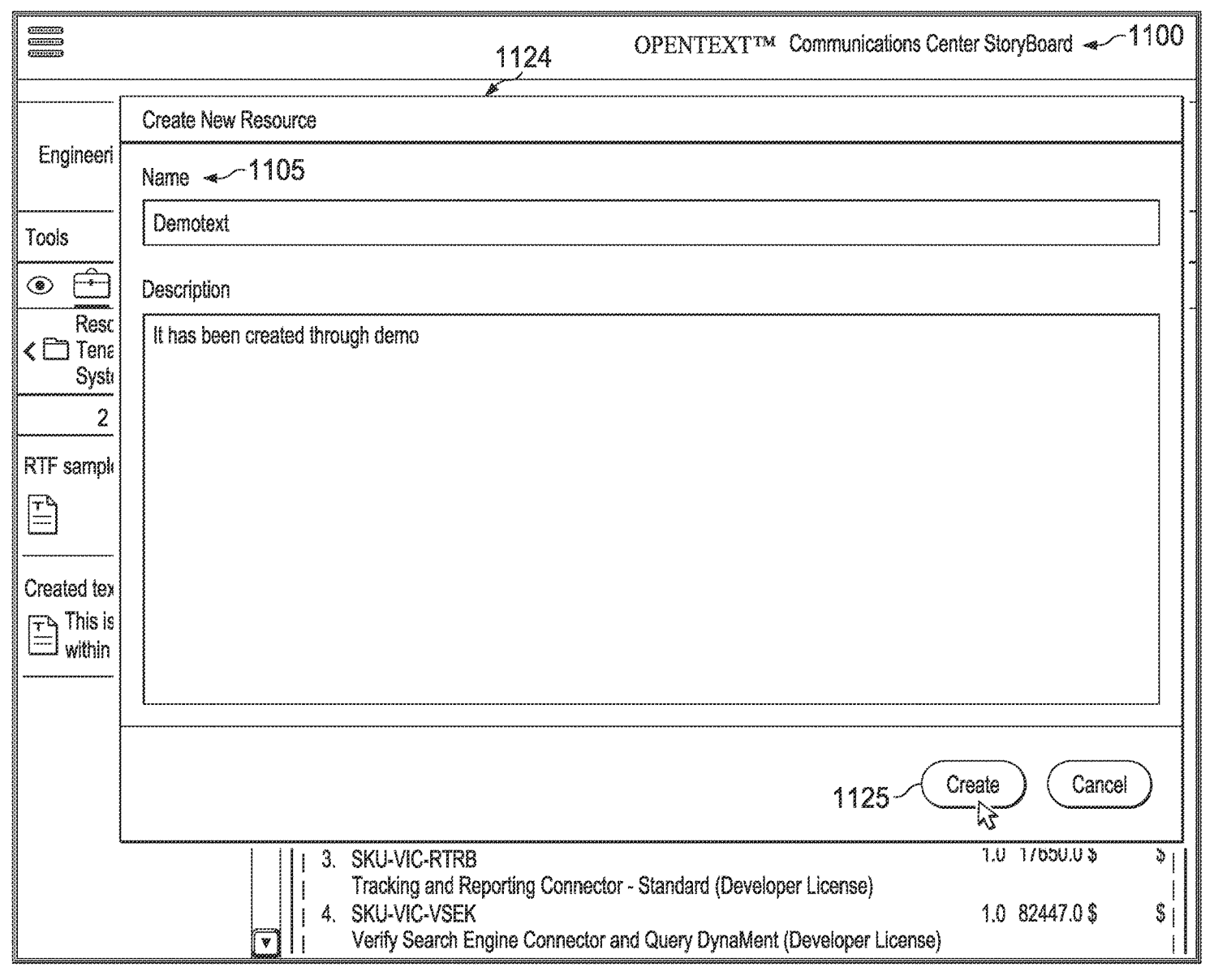

As an example, the user may actuate, invoke, click, or otherwise select button 1122 to create a new fragment within section 1120 of theme 1190. Responsive to this user action, application 1100 may display window 1124 as shown in FIG. 11B. Window 1124 may be configured for creating a new resource (which the system processes, stores, and manages as a fragment). As described above, fragments can be created in other ways. Thus, FIG. 11B represents a non-limiting example by which a fragment can be generated responsive to user interaction with the system via application 1100. Through window 1124, new resource 1105 is given a name and a description. This description describes resource 1105 and is considered as the custom metadata for resource 1105. The user can complete the fragment creation process by selecting "Create" button 1125, which causes application 1100 to close window 1124 and communicate a fragment creation request containing the name and the description of new resource 1105 to the system.

The system, in turn, processes the fragment creation request received from application 1100 over the network in real time. The resources view and the layout view are then dynamically updated to include the newly created resource 1105, as illustrated in FIG. 11C.

Initially, the newly created resource 1105 (which, in this example, is a text fragment) is empty and does not contain any information (e.g., text). In this regard, resources can be created (e.g., by one user) from within a theme to serve as placeholders for subsequent editing (e.g., by multiple users). To edit resource 1105, the user may navigate to section 1120 and, as the user's pointing device hovers over the newly added resource 1105, fragment editing tool 1150 may be highlighted, showing a plurality of functions 1151, 1153, and 1155, through which the user may select a rule or rules applicable to resource 1105, edit resource 1105, and/or remove resource 1105 from section 1120.

Figure 11D:
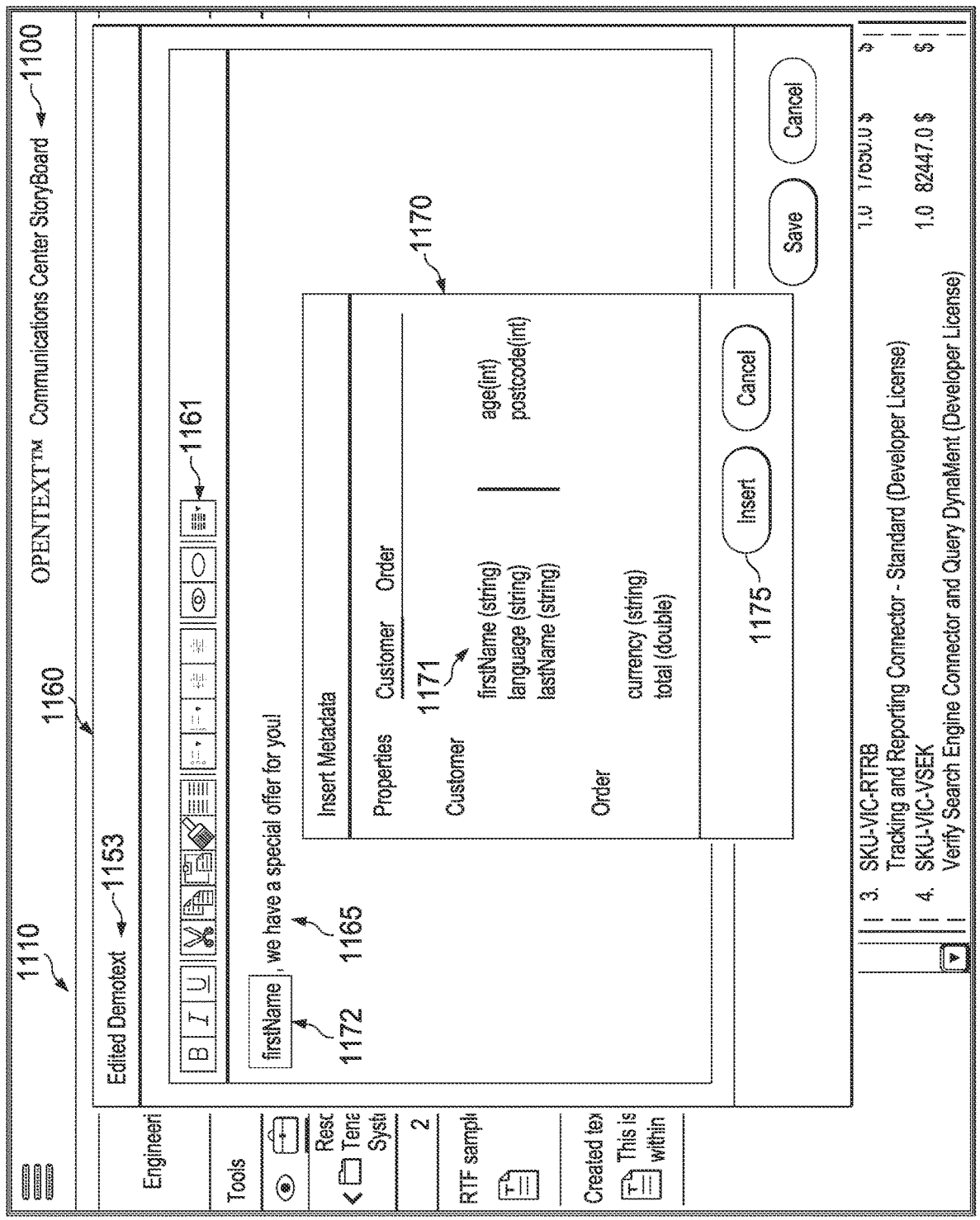

As a non-limiting example, upon user selection of edit function 1153 to edit resource 1105, application 1100 may display edit function 1153 in window 1160, as illustrated in FIG. 11D. Responsive to user selection of metadata button 1161, window 1170 with properties available for use by resource 1105 may be displayed. Property availability may vary from fragment to fragment depending upon the metadata model used. At runtime, properties in the metadata model are exchanged with real customer data. In this example, property 1171 is selected and, upon user selecting "Insert" button 1175, window 1170 is closed and metadata field 1172 is automatically displayed in window 1160. In this example, additional text is added following metadata field 1172. When done editing, the user can save resource 1105 and, responsive to user saving edits 1165 to resource 1105, application 1100 closes window 1160 and, in real time, communicates edits 1165 containing the text and metadata field 1172 to the system over the network.

Figure 11E:
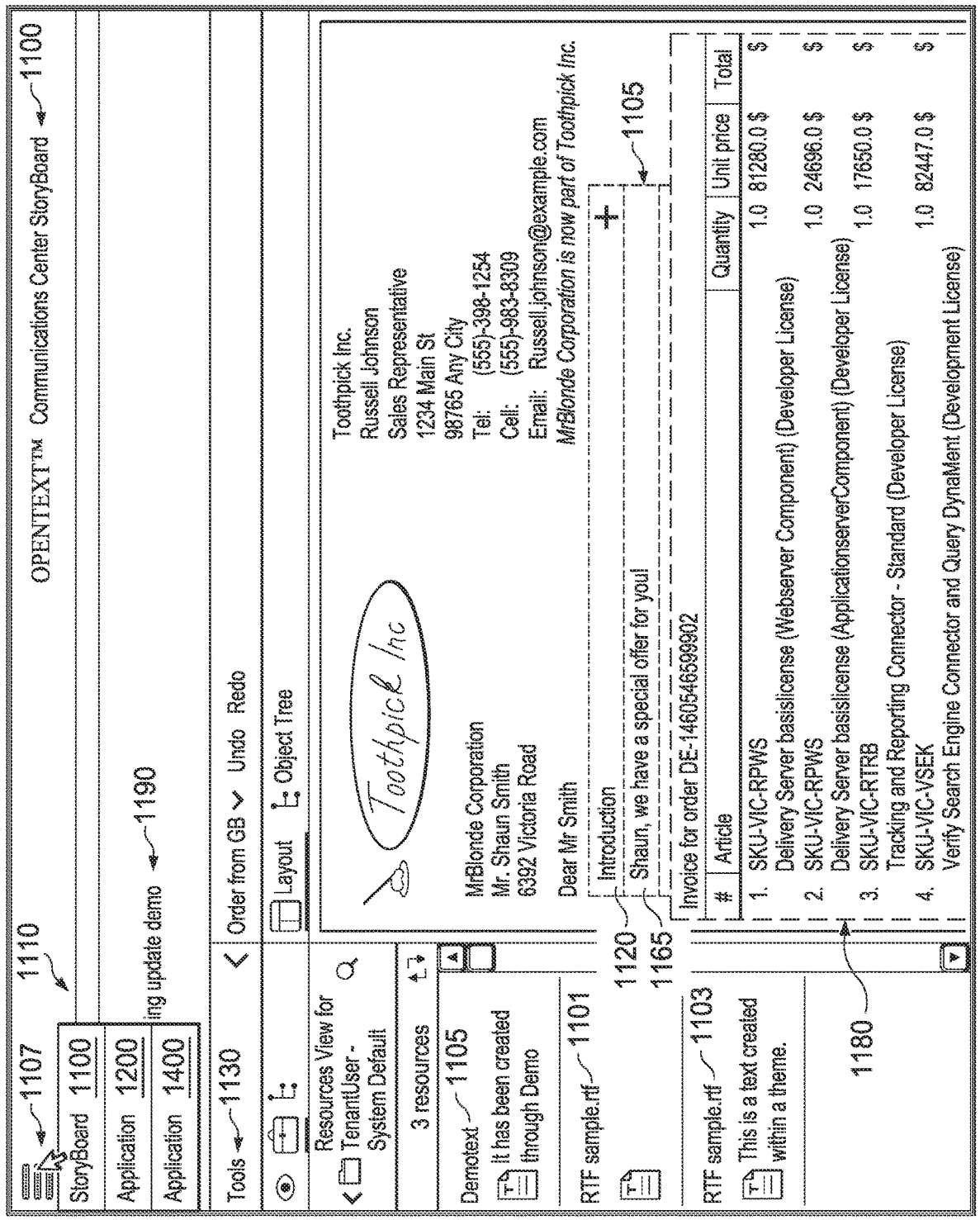

The system, in response, updates resource 1105 (which is stored at the backend as a fragment) with edits 1165 and dynamically re-render the layout view accordingly, as illustrated in FIG. 11E. At this point, the user may navigate to another section (e.g., section 1180) of theme 1190 or access menu 1107 to switch to another application (e.g., application 1200 or application 1400).

FIGS. 12A-12E depict diagrammatic representations of an example user interface of another example application with which granular access controls at the section level can be configured according to some embodiments. As a non-limiting example, application 1200 may be accessible via menu 1107 shown in FIG. 11E. Skilled artisans appreciate that other ways to access application 1200 may also be possible.

Like application 1100, application 1200 may be configured for communicating with a system implementing the DA disclosed herein (e.g., DA system 900 shown in FIG. 9A). Application 1200 may include user interface 1210 having a plurality of tabs 1220 for accessing different functions for working on resources, templates, and services provided by the system over the network (e.g., via a service gateway, as described above).

Figure 12A:
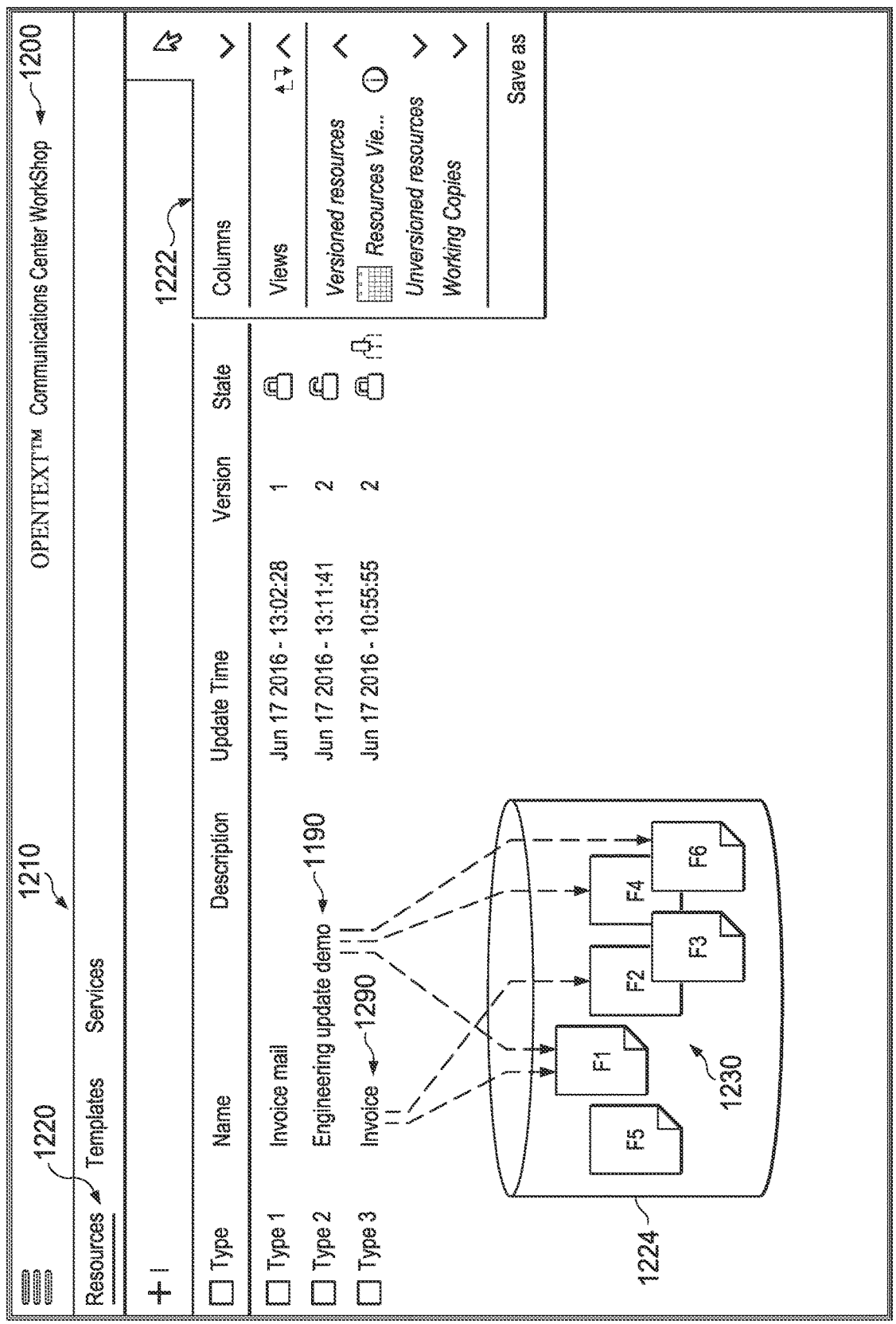
FIGS. 12A-12E depict diagrammatic representations of an example user interface of another example application with which granular access controls at the section level can be configured according to some embodiments.

As illustrated in FIG. 12A, the resources view may display a list of themes, each of which may reference certain fragments 1230 stored in Fragment Storage 1224. For example, theme 1190 may reference fragments F1, F4, and F6 and theme 1290 may reference fragments F1 and F2. In this example, F1 is used by both themes 1190 and 1290.

Thus, access controls applied to F1 would be applied to both themes 1190 and 1290. Notice in this example, each of themes 1190 and 1290 has two versions. As a non-limiting example, a version of theme 1190 can be created by selecting theme 1190 from the resources view, accessing menu 1222, selecting "Working copies" from menu 1222, and duplicating theme 1190 to create a working copy of theme 1190.

Figure 12B:
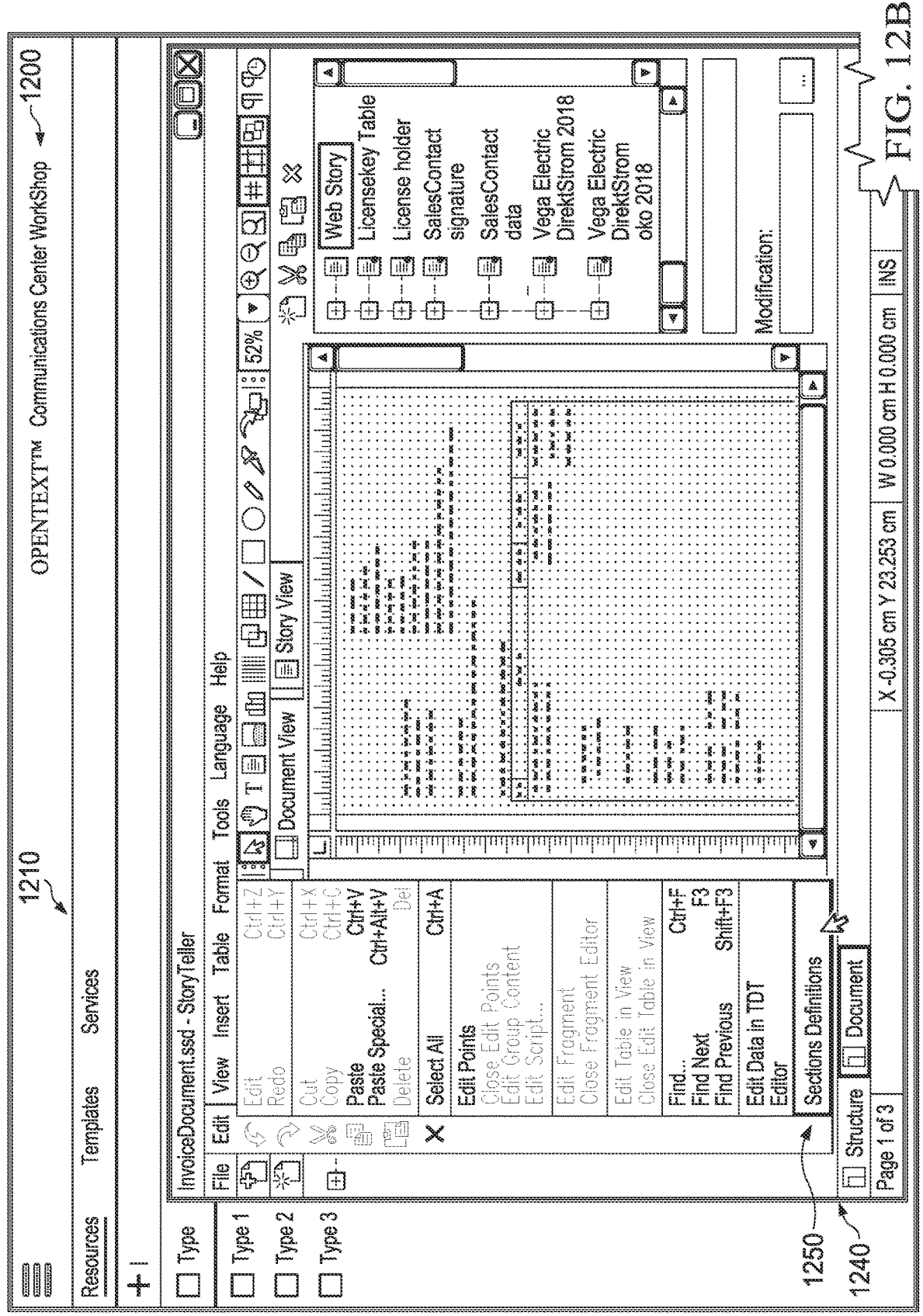

Each theme can be edited using a design tool via application 1200. Example design tool 1240 is illustrated in FIG. 12B. Design tool 1240 may be provided by the system as a web-based service, as described above. Users in various roles (e.g., manager, supervisor, reviewer, writer, administrator, etc.) may use design tool 1240 to edit, for instance, theme 1190 described above. In this example, the user may navigate to menu item 1250 of design tool 1240 to access ACLs associated with sections within theme 1190.

Figure 12C:
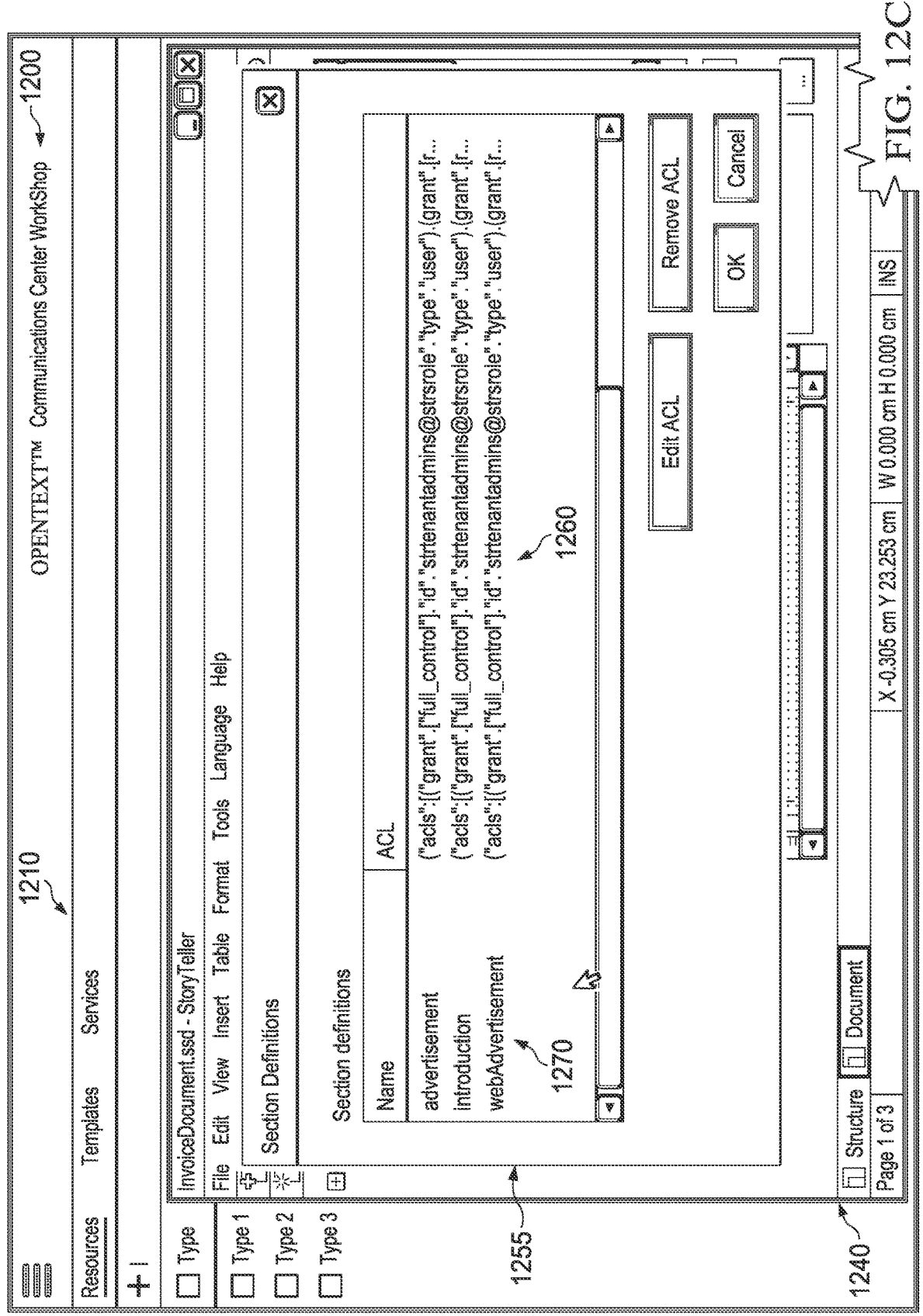
Figure 12D:
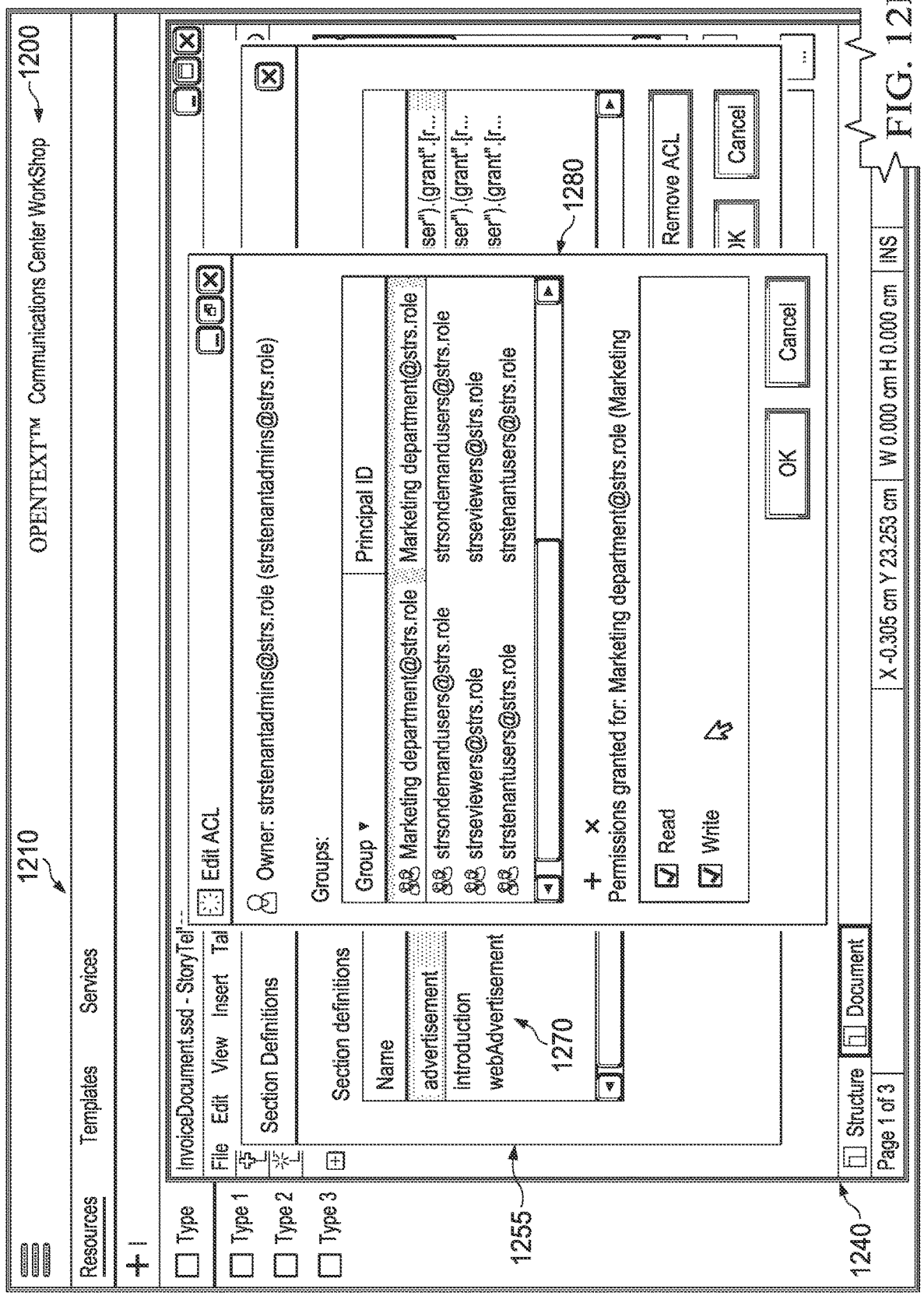
Figure 12E:
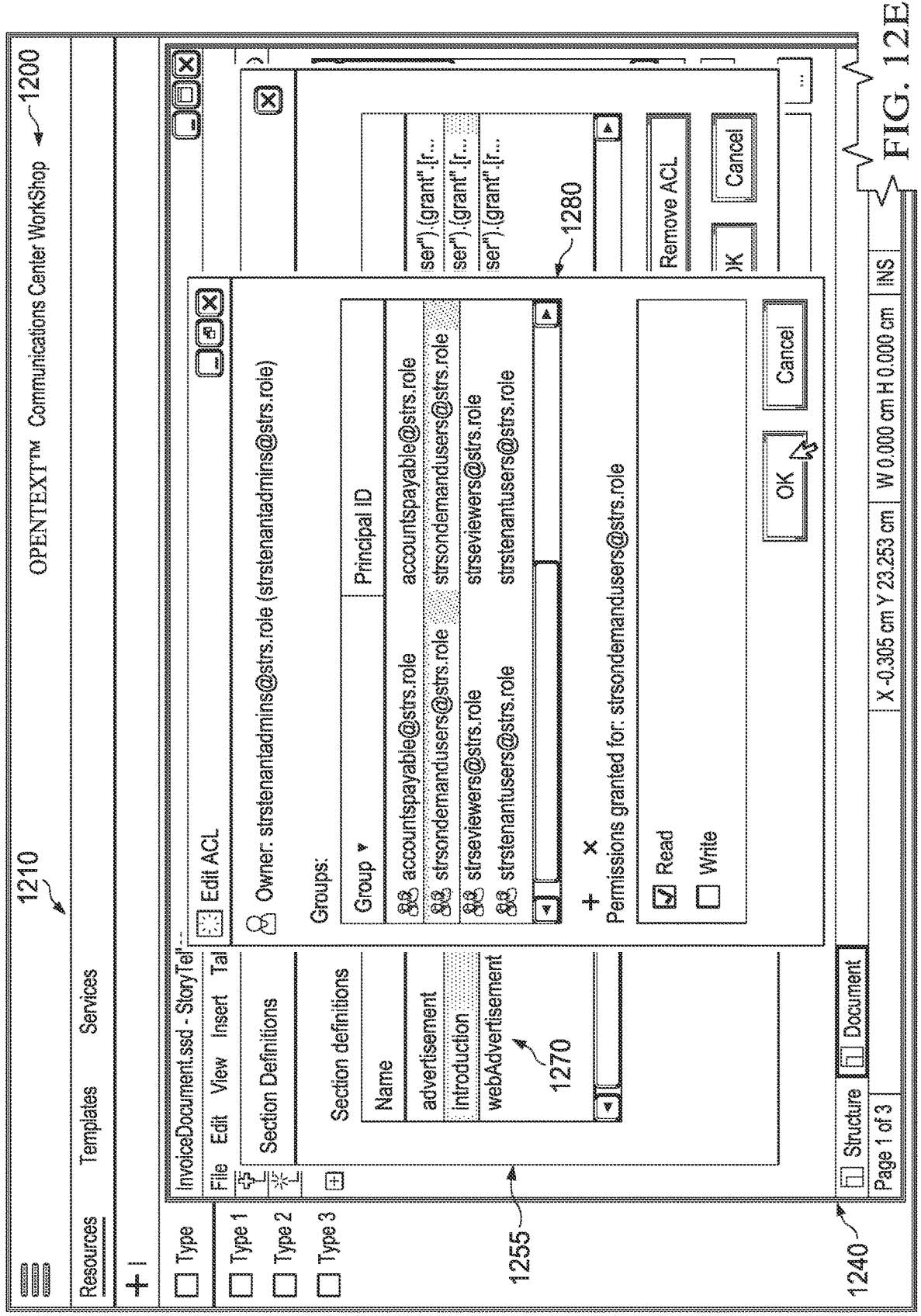

As illustrated in FIG. 12C, responsive to user selecting menu item 1250 of design tool 1240 to access ACLs associated with sections within theme 1190, design tool 1240 may display ACL configuration tool 1255 in a separate window, showing ACLs 1260 associated with sections 1270 of theme 1190. The user can edit or remove an ACL via ACL configuration tool 1255. FIGS. 12D and 12E show that different sections 1270 may have different access controls applied to different user groups (which are defined based on roles). As described above, sections 1270 are driven by fragments used by the underlying system to render the theme. Thus, these access controls are referred to as fragment-driven, role-based access controls. The user can edit each access control via ACL editing tool 1280 (e.g., granting or denying a read or write permission for a particular user group associated with a principal identifier), as illustrated in FIGS. 12D and 12E.

Figure 13A:
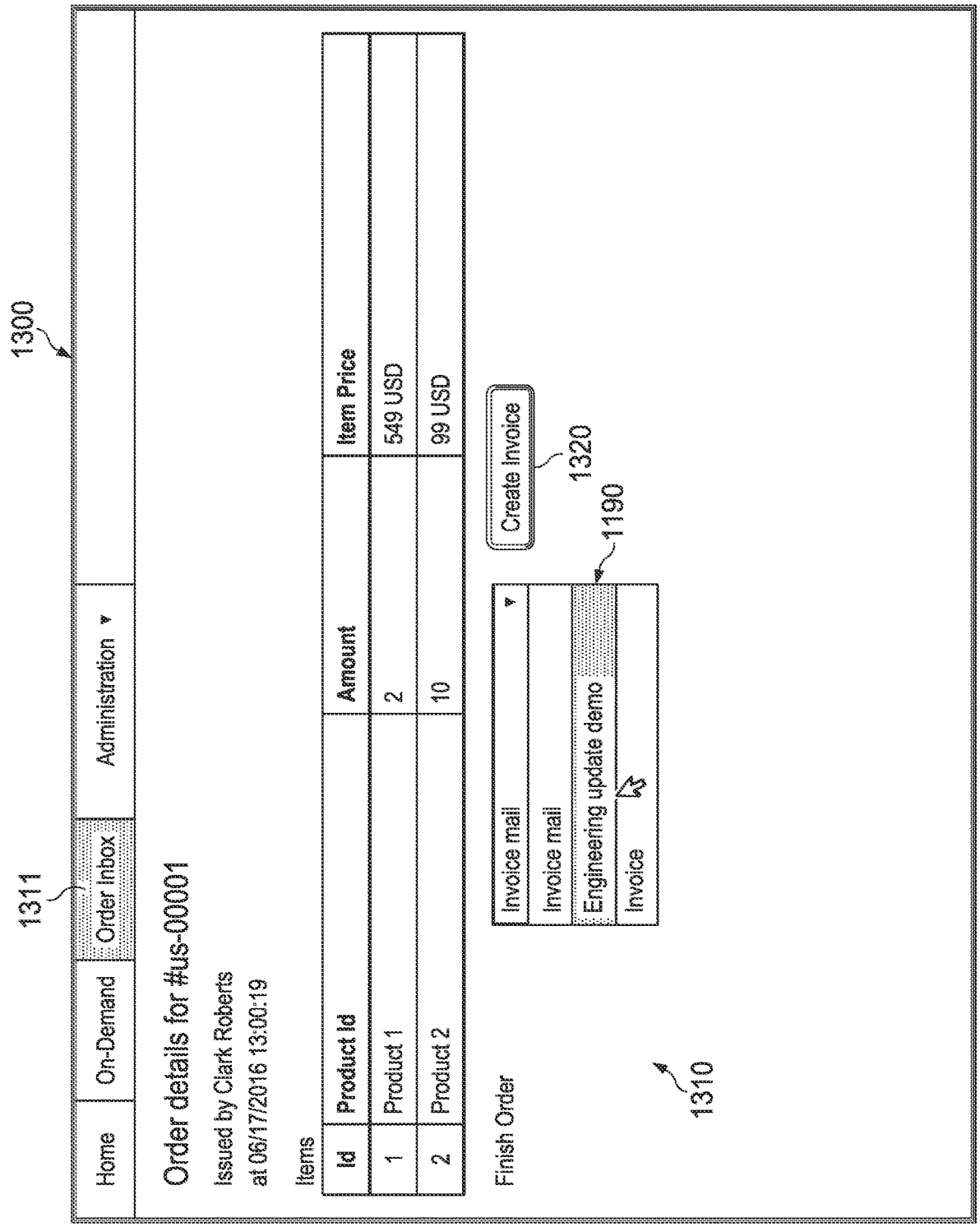
FIGS. 13A-13C depict diagrammatic representations of an example user interface of yet another example application through which resources at the fragment level can be viewed and a theme can be selected for on-demand document production according to some embodiments.
Figure 13B:
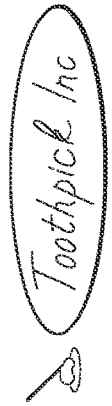
Figure 13C:
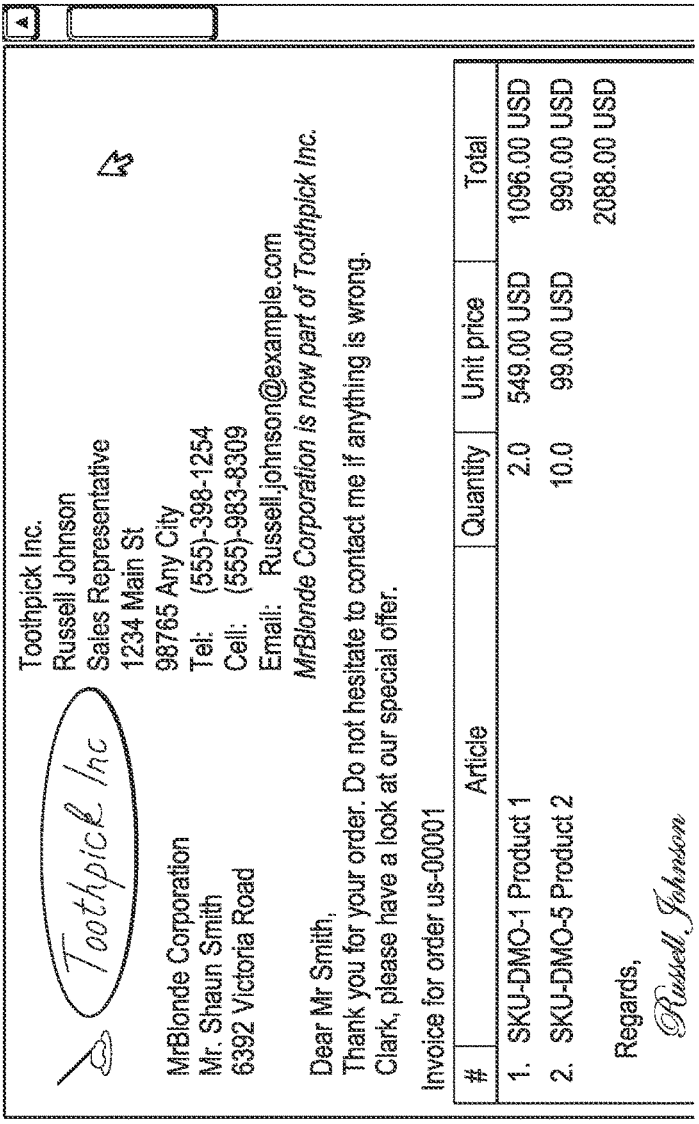

FIGS. 13A-13C depict diagrammatic representations of an example user interface of yet another example application through which resources at the fragment level can be viewed and a theme can be selected for on-demand document production according to some embodiments. In this case, application 1300 may include user interface 1310 having a plurality of tabs, including tab 1311 where document production may be requested. In this example, resources of a DA system disclosed herein may be made available to application 1300 via a theme menu listing available themes such as theme 1190 described above. To request on-demand generation of documents using theme 1190, the user may navigate to select theme 1190 and document creation button 1320, as shown in FIG. 13A.

Responsive to the user selecting document creation button 1320, a request for document product referencing theme 1190 may be communicated to the DA system over the network. The user may navigate to tab 1315, as shown in FIG. 13B, to view document 1330 that has been dynamically assembled on-demand and rendered from fragments based on theme 1190 in real time by the DA system.

As illustrated in FIGS. 13B-13C, the user may access tools 1340 and view these fragments as resources 1350 (e.g., responsive to a user invoking tools 1340 shown in FIG. 13B, a portion of user interface 1310 slides to the right side of the screen, allowing a window or view to expand and reveal tools 1340 and resources 1350, as shown in FIG. 13C). Notice in this case, though, the user of application 1300 cannot edit any part of on-demand document 1330.

Figure 14A:
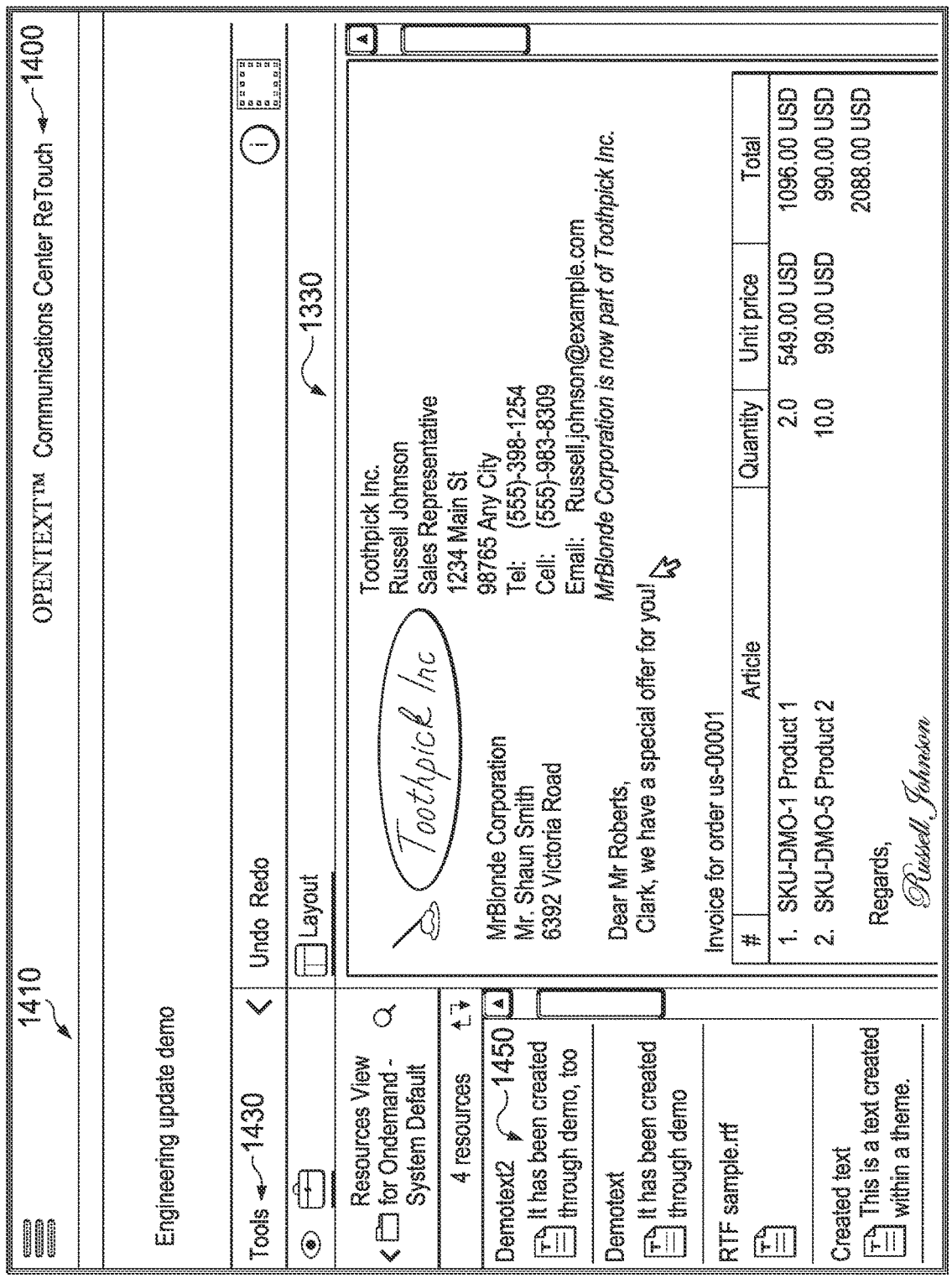
Figure 14B:
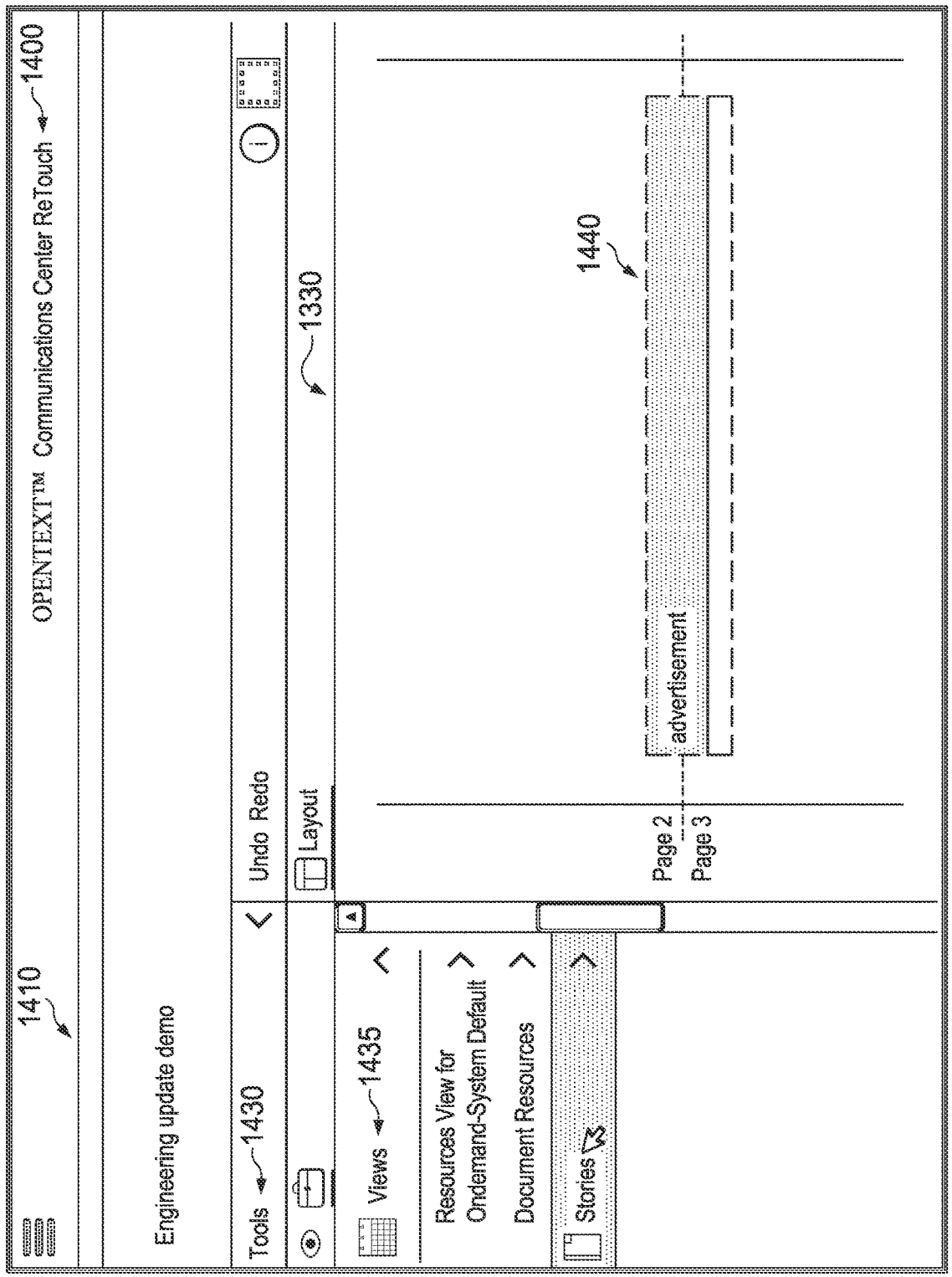
Figure 14C:
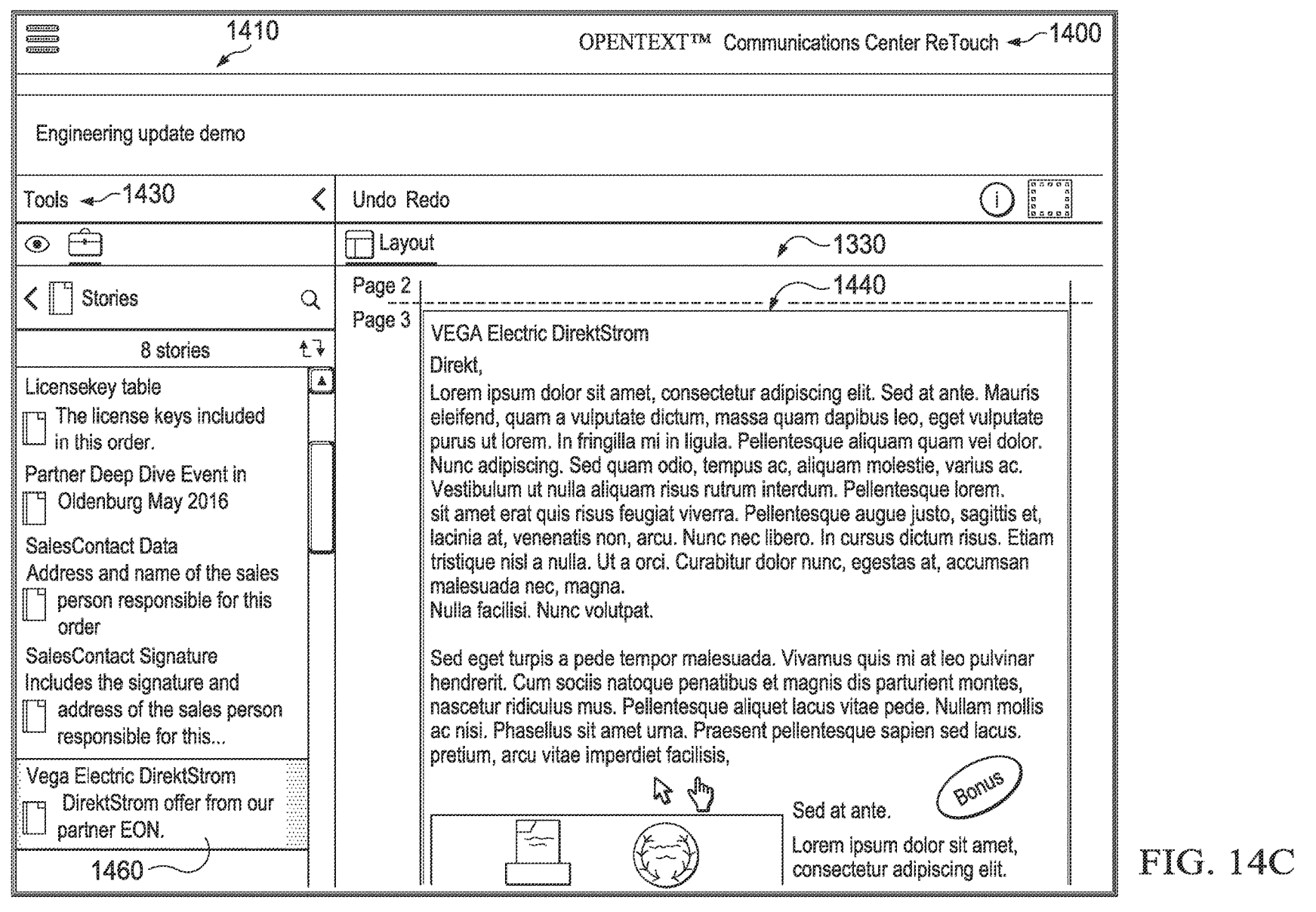

FIGS. 14A-14C depict diagrammatic representations of an example user interface of yet another example application through which users of different roles may be presented with different versions and different editable sections of the same document according to some embodiments. Like application 1200, application 1400 may be accessible via menu 1107 shown in FIG. 11E. Skilled artisans appreciate that other ways to access application 1400 may also be possible.

Like applications 1100, 1200, and 1300, application 1400 may be configured for communicating with a system implementing the DA disclosed herein (e.g., DA system 900 shown in FIG. 9A). Application 1400 may include tools 1430 accessible via user interface 1410. User interface 1410 may be configured for displaying a resources view and a layout view, similar to application 1100. In this case, the resources view displays resources 1450 used in construction of document 1330 displayed in the layout view. As described above, document 1330 is dynamically constructed on-demand (i.e., responsive to a document production request in real time).

Notice that document 1330 displayed in the layout view of application 1400 contains an introduction, but no editable introduction section is highlighted when the user's pointing device hovers over the introduction. This is because the user is logged in to the DA system as someone who does not have the write privilege to the introduction section. Suppose the user's job function is in advertising and thus has permission to modify document 1330 for advertising purposes, the user may navigate to advertisement section 1440, as illustrated in FIG. 14B, and insert an advertisement fragment there. As also illustrated in FIG. 14B, tools 1430 may be configured to allow the user to navigate and switch between different views and/or accessing services provided by the DA system to, for instance, insert ad fragment 1460 in advertisement section 1440, as illustrated in FIG. 14C.

Figure 15:
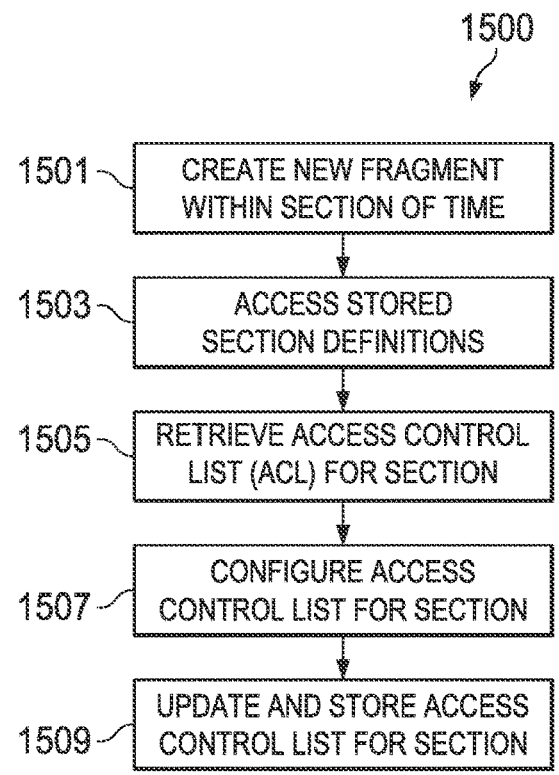
FIG. 15 depicts a flow chart illustrating an example method of fragment-driven, role-based access control configuration according to some embodiments.

FIG. 15 depicts a flow chart illustrating an example method of fragment-driven, role-based access control configuration according to some embodiments. Referring to FIGS. 11A-12E described above, method 1500 may include receiving, by a DA system via a user interface on a client device, user instruction to create a new fragment within a section of a theme (1501). Responsive to user request to access section definitions (1503), and as driven by fragments corresponding to the section of interest, the DA system may retrieve an ACL containing role-based access controls stored at the backend (1505) and return same to the client device. Responsive to user configuring/editing the ACL (e.g., deleting an access control setting for a particular user group, denying/granting a permission associated with an access control listed on the ACL, etc.) (1507), the DA system may update the ACL and store the updated ACL at the backend accordingly (1509).

Figure 16:
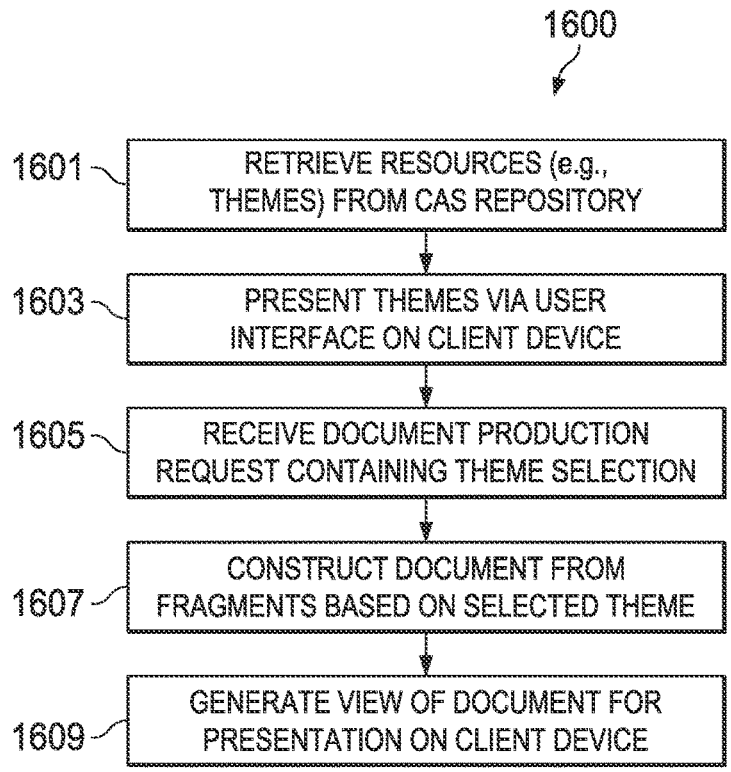
FIG. 16 depicts a flow chart illustrating an example method of document production according to some embodiments.

FIG. 16 depicts a flow chart illustrating an example method of document production according to some embodiments. Referring to FIGS. 13A-13C described above method 1600 may include retrieving, by the DA system, resources such as themes from the CAS repository described above (1601) and presenting them via a user interface on a client device (1603). The DA system may receive from the client device a document product request containing information about a selected theme (1605). In response, the DA system may dynamically assemble a document from resources residing at the backend based on the theme selected by the user (1607). The document constructed dynamically on-demand is rendered and a view is generated for presentation on the client device (1609).

Figure 17:
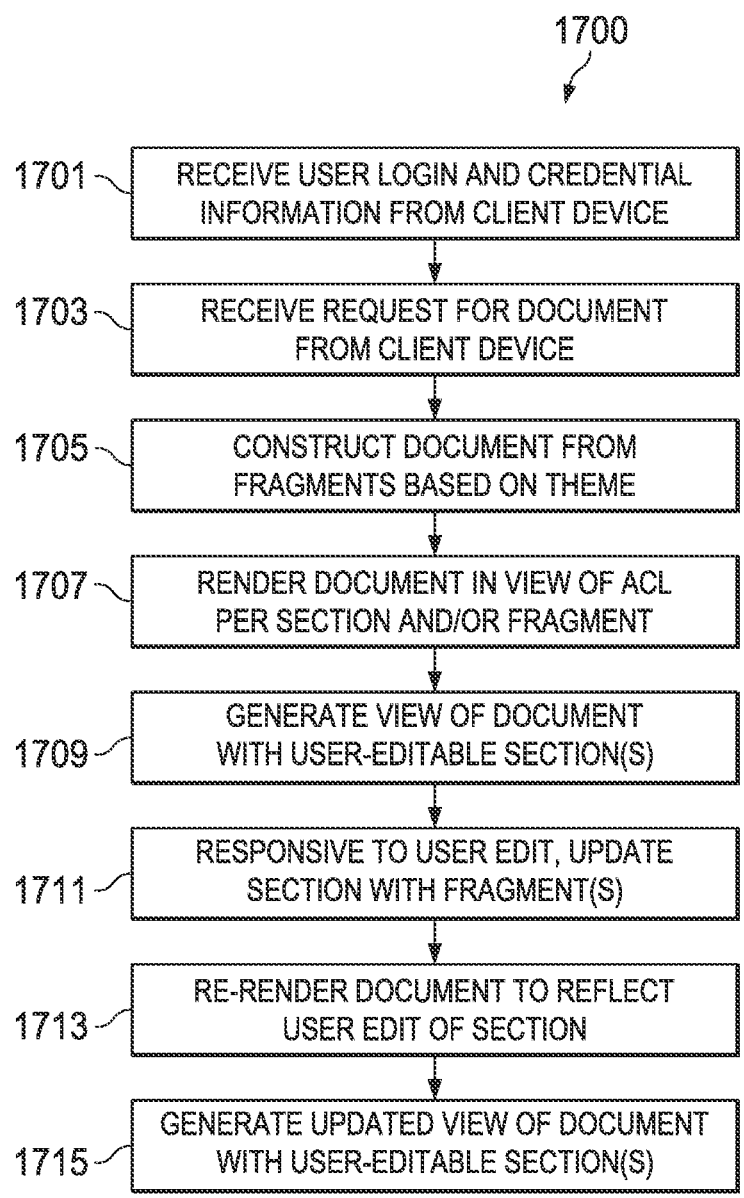
FIG. 17 depicts a flow chart illustrating an example method of dynamic document production according to some embodiments.

FIG. 17 depicts a flow chart illustrating an example method of dynamic document production according to some embodiments. Referring to FIGS. 14A-14B described above, the DA system may receive user login and credential information from a client device (1701) and, in response, present a view on the client device of resources available through the DA system. The DA system may receive a request from the client device to view a document (1703). The request may reference a theme. The DA system may dynamically construct the requested document from fragments stored in the Fragment Storage described above based on the theme referenced in the request received from the client device (1705). As the DA system processes the fragments for rendering, the DA system may include or exclude information based on access controls configured based on roles and driven by the fragments at issue (1707). The DA system may generate a view of the document rendition. Depending upon permissions specified in the fragment-driven, role-based access controls applied during the rendering, the view may contain no user-editable sections (if the user does not have any write permission to any section of the theme). Alternatively, if a section definition associated with a section specifies a write permission for a role associated with the user, the section may be rendered and shown in the view as being editable (1709). Responsive to the user editing the editable section, the DA system may dynamically update the fragment(s) corresponding to the section (1711) and dynamically re-render the document (again, from the fragments, including the updated one(s)) to reflect the change(s) to the particular section (1713). The DA system may generate an updated view (e.g., a preview) of the document for presentation on the client device (1715).

Figure 18:
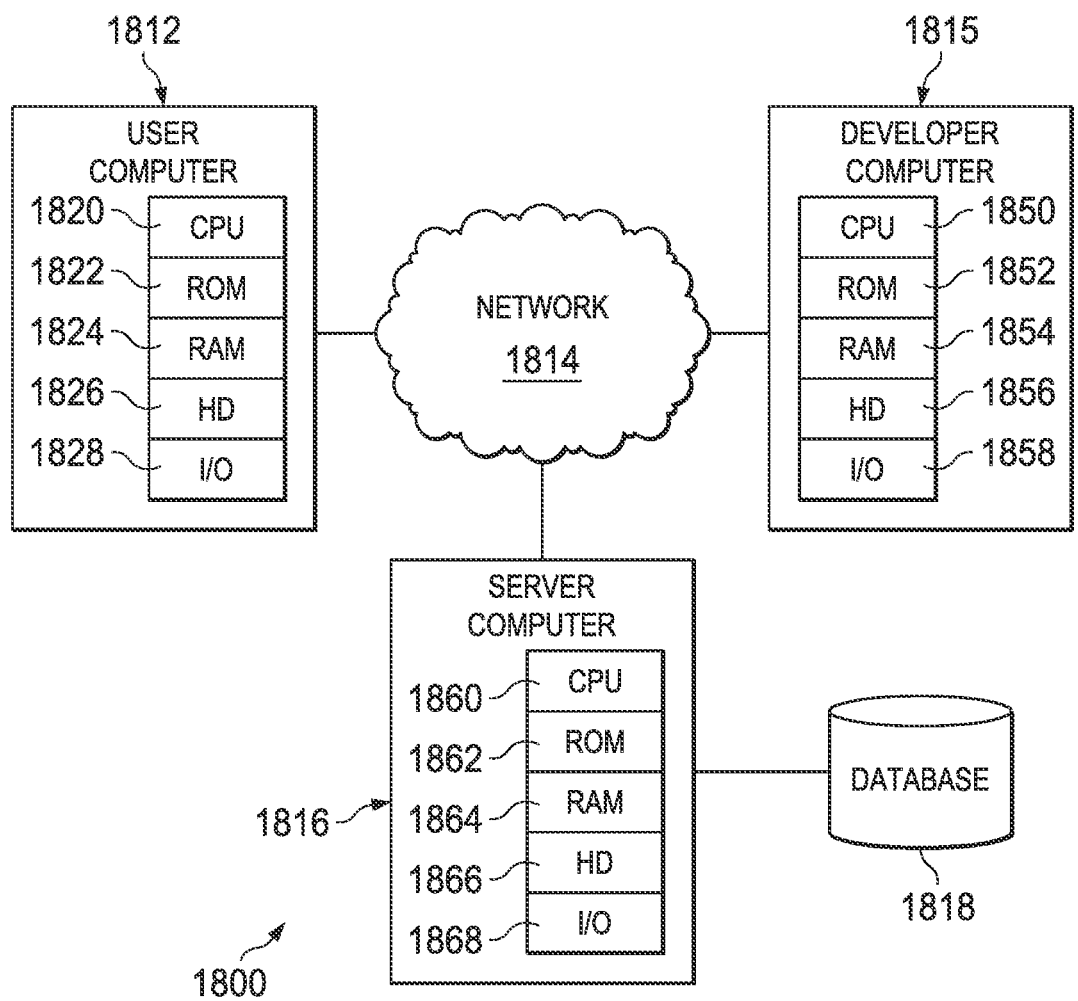
FIG. 18 depicts a diagrammatic representation of an example of an enterprise network computing environment where embodiments disclosed can be implemented.

FIG. 18 depicts a diagrammatic representation of an example of an enterprise network computing environment where embodiments disclosed can be implemented. In the example illustrated, network computing environment 1800 includes network 1814 that can be bi-directionally coupled to user computer 1812, service developer computer 1815, and server computer 1816. Server computer 1816 can be bi-directionally coupled to database 1818. Network 1814 may represent a combination of wired and wireless networks that network computing environment 1800 may utilize for various types of network communications known to those skilled in the art.

For the purpose of illustration, a single system is shown for each of user computer 1812, service developer computer 1815, and server computer 1816. However, within each of user computer 1812, service developer computer 1815, and server computer 1816, a plurality of computers (not shown) may be interconnected to each other over network 1814. For example, a plurality of user computers 1812 and a plurality of service developer computers 1815 may be coupled to network 1814. User computers 1812 may include data processing systems for communicating with server computer 1816. Service developer computers 1815 may include data processing systems for individuals whose jobs may require them to configure services used by user computers 1812 in network computing environment 1800.

User computer 1812 can include central processing unit ("CPU") 1820, read-only memory ("ROM") 1822, random access memory ("RAM") 1824, hard drive ("HD") or storage memory 1826, and input/output device(s) ("I/O") 1828. I/O 18218 can include a keyboard, monitor, printer, electronic pointing device (e.g., mouse, trackball, stylus, etc.), or the like. User computer 1812 can include a desktop computer, a laptop computer, a personal digital assistant, a cellular phone, or nearly any device capable of communicating over a network. Service developer computer 1815 may be similar to user computer 1812 and can comprise CPU 1850, ROM 1852, RAM 1854, HD 1856, and I/O 1858.

Likewise, server computer 1816 may include CPU 1860, ROM 1862, RAM 1864, HD 1866, and I/O 1868. Server computer 1816 may include one or more backend systems configured for providing a variety of services to user computers 1812 over network 1814. One example of such a backend system can be a database management system for database 1818. Many other alternative configurations are possible and known to skilled artisans.

Each of the computers in FIG. 18 may have more than one CPU, ROM, RAM, HD, I/O, or other hardware components. For the sake of brevity, each computer is illustrated as having one of each of the hardware components, even if more than one is used. Each of computers 1812, 1815, and 1816 is an example of a data processing system. ROM 1822, 1852, and 1862; RAM 1824, 1854, and 1864; HD 1826, 1856, and 1866; and database 1818 can include media that can be read by CPU 1820, 1850, or 1860. Therefore, these types of memories include non-transitory computer-readable storage media. These memories may be internal or external to computers 1812, 1815, or 1816.

Portions of the methods described herein may be implemented in suitable software code that may reside within ROM 1822, 1852, or 1862; RAM 1824, 1854, or 1864; or HD 1826, 1856, or 1866. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method for document production, comprising:
receiving from a client device, by a document production system having a processor and a non-transitory computer-readable medium, login information for a user and a request for a document, the request referencing a theme associated with the document, the theme containing a section having an access control list associated therewith, the access control list specifying a user group and corresponding permission for the user group;
retrieving, by the document production system responsive to the request, the theme;
invoking, by the document production system, a renderer to produce a version of the document, wherein producing the version of the document includes determining whether the user has permission to view or edit the section of the theme;
generating, by the renderer, a view containing the version of the document using one or more fragments associated with the theme, wherein the fragments comprise formatted fragments, wherein the generating comprises retrieving, from a resource repository, the formatted fragments associated with the theme and meta information that describes the document, and wherein, responsive to the user not having the permission to view the section of the theme, the section is not included in the version of the document; and
communicating, by the document production system, the view to the client device for presentation on the client device.

2. The method according to claim 1, wherein a formatted fragment references one or more messages and wherein the formatted fragment is augmented, extended, or refined with an instruction or additional information pertaining to at least one of layout information, format information, style information, or print optimization.

3. The method according to claim 1, wherein production of the version of the document comprises rendering the section as a view-only section in the version of the document responsive to the user having the permission to view but not to edit the section of the theme.

4. The method according to claim 1, wherein production of the version of the document comprises rendering the section as a user-editable section in the version of the document responsive to the user having the permission to view and edit the section of the theme.

5. The method according to claim 4, further comprising:
receiving an indication from the client device that the user-editable section in the version of the document has been modified; and
dynamically re-rendering the version of the document with the modified user-editable section.

6. The method according to claim 5, wherein the dynamically updating comprises:
dynamically rearranging formatted fragments in the user-editable section;
re-rendering the version of the document;
generating an updated view of the version of the document; and
communicating the updated view to the client device.

7. A document production system, comprising:
a processor;
a non-transitory computer-readable medium; and
stored instructions translatable by the processor for:
receiving, from a client device, user login information and a request for a document, the request referencing a theme associated with the document, the theme containing a section having an access control list associated therewith, the access control list specifying a user group and corresponding permission for the user group;
retrieving, responsive to the request, the theme;
invoking a renderer to produce a version of the document, wherein producing the version of the document includes determining whether the user has permission to view or edit the section of the theme;
generating, by the renderer, a view containing the version of the document using one or more fragments associated with the theme, wherein the fragments comprise formatted fragments, wherein the generating comprises retrieving, from a resource repository, the formatted fragments associated with the theme and meta information that describes the document, and wherein, responsive to the user not having the permission to view the section of the theme, the section is not included in the version of the document; and
communicating the view to the client device for presentation on the client device.

8. The document production system of claim 7, wherein a formatted fragment references one or more messages and wherein the formatted fragment is augmented, extended, or refined with an instruction or additional information pertaining to at least one of layout information, format information, style information, or print optimization.

9. The document production system of claim 7, wherein production of the version of the document comprises rendering the section as a view-only section in the version of the document responsive to the user having the permission to view but not to edit the section of the theme.

10. The document production system of claim 7, wherein production of the version of the document comprises rendering the section as a user-editable section in the version of the document responsive to the user having the permission to view and edit the section of the theme.

11. The document production system of claim 10, wherein the stored instructions are further translatable by the processor for:
receiving an indication from the client device that the user-editable section in the version of the document has been modified; and
dynamically re-rendering the version of the document with the modified user-editable section.

12. The document production system of claim 11, wherein the dynamically updating comprises:
dynamically rearranging formatted fragments in the user-editable section;

re-rendering the version of the document;
generating an updated view of the version of the document; and
communicating the updated view to the client device.

13. A computer program product comprising a non-transitory computer-readable medium storing instructions translatable by a processor of a document production system for:
receiving, from a client device, user login information and a request for a document, the request referencing a theme associated with the document, the theme containing a section having an access control list associated therewith, the access control list specifying a user group and corresponding permission for the user group;
retrieving, responsive to the request, the theme;
invoking a renderer to produce a version of the document, wherein producing the version of the document includes determining whether the user has permission to view or edit the section of the theme;
generating, by the renderer, a view containing the version of the document using one or more fragments associated with the theme, wherein the fragments comprise formatted fragments, wherein the generating comprises retrieving, from a resource repository, the formatted fragments associated with the theme and meta information that describes the document, and wherein, responsive to the user not having the permission to view the section of the theme, the section is not included in the version of the document; and
communicating the view to the client device for presentation on the client device.

14. The computer program product of claim 13, wherein a formatted fragment references one or more messages and wherein the formatted fragment is augmented, extended, or refined with an instruction or additional information pertaining to at least one of layout information, format information, style information, or print optimization.

15. The computer program product of claim 13, wherein production of the version of the document comprises rendering the section as a view-only section in the version of the document responsive to the user having the permission to view but not to edit the section of the theme.

16. The computer program product of claim 13, wherein production of the version of the document comprises rendering the section as a user-editable section in the version of the document responsive to the user having the permission to view and edit the section of the theme.

17. The computer program product of claim 16, wherein the instructions are further translatable by the processor for:
receiving an indication from the client device that the user-editable section in the version of the document has been modified; and
dynamically updating the version of the document, wherein the dynamically updating comprises:
dynamically rearranging formatted fragments in the user-editable section;
re-rendering the version of the document;
generating an updated view of the version of the document; and
communicating the updated view to the client device.

* * * * *